SINGLE-CARRIER COLOR TELEVISION SYSTEMS

Filed March 19, 1951 11 Sheets-Sheet 1

Inventor:
Robert B. Dome.
by Merton D. Moore
His Attorney.

Inventor:
Robert B Dome,
by Merton D Moore
His Attorney.

Inventor:
Robert B. Dome,
by Merton D. Moore
His Attorney.

Inventor:
Robert B. Dome,
by Merton D. Morse
His Attorney.

Inventor:
Robert B. Dome,
by Merton D. Morse
His Attorney.

April 22, 1958 R. B. DOME 2,831,916

SINGLE-CARRIER COLOR TELEVISION SYSTEMS

Filed March 19, 1951 11 Sheets-Sheet 6

Inventor:
Robert B. Dome,
by Merton D. Moore
His Attorney.

April 22, 1958 R. B. DOME 2,831,916

SINGLE-CARRIER COLOR TELEVISION SYSTEMS

Filed March 19, 1951 11 Sheets-Sheet 7

Inventor:
Robert B. Dome,
by Merton D. Morse
His Attorney.

April 22, 1958 R. B. DOME 2,831,916

SINGLE-CARRIER COLOR TELEVISION SYSTEMS

Filed March 19, 1951 11 Sheets-Sheet 8

Inventor:
Robert B. Dome,
by Merlon D. Moore
His Attorney.

April 22, 1958 R. B. DOME 2,831,916

SINGLE-CARRIER COLOR TELEVISION SYSTEMS

Filed March 19, 1951 11 Sheets-Sheet 9

Inventor:
Robert B. Dome,
by Merton D. Moore
His Attorney.

Inventor:
Robert B. Dome,
by Merton D. Moore
His Attorney.

April 22, 1958 R. B. DOME 2,831,916

SINGLE-CARRIER COLOR TELEVISION SYSTEMS

Filed March 19, 1951 11 Sheets-Sheet 11

Inventor:
Robert B. Dome,
by Merton D. Moore
His Attorney.

United States Patent Office 2,831,916

Patented Apr. 22, 1958

2,831,916

SINGLE-CARRIER COLOR TELEVISION SYSTEMS

Robert B. Dome, Geddes Township, Onondaga County, N. Y., assignor to General Electric Company, a corporation of New York Application March 19, 1951, Serial No. 216,324

17 Claims. (Cl. 178—5.2)

My invention relates to new and improved systems for transmitting and receiving television or facsimile images in natural colors, and it has for a main object the transmission and reproduction of a high-quality colored television picture within the same technical standards which have been established in the United States for the transmission and reproduction of black-and-white, or monochrome, pictures.

According to current television broadcasting standards in the United States for monochrome picture transmission, the televised scene is sequentially scanned from left to right and from top to bottom in a series of narrow horizontal lines, in a manner analogous to the way the eye of a reader scans a page of printed material. Each complete scan of the scene to be transmitted, or picture frame, requires the scanning spot at the transmitter or receiver to traverse 525 horizontal scanning lines across the scene within 1/30 second. To reduce flicker, double interlace is employed, i. e., 262½ "odd lines" are first scanned within 1/60 second, constituting one picture field, and the remaining 262½ "even lines" are scanned during the next picture field to complete the frame. Thus, the horizontal scanning rate is 15,750 lines per second, and the vertical scanning rate is 60 fields per second. As is well known to those skilled in the art, various blanking and synchronizing pulses are also inserted at these same rates at the ends of the scanning lines and picture fields. The composite television picture signal, as above described, is modulated upon a picture carrier wave, and any accompanying sound signals are modulated upon a second carrier wave spaced 4.5 megacycles above the picture carrier. The two carriers and their sideband components are required to be transmitted within a channel having a total bandwidth of 6 megacycles, of which approximately 4.75 megacycles is devoted to the transmission of the picture signal components. By employing unsymmetrical or vestigial transmission of the picture signal sidebands, a total range of picture signal components up to about 4 megacycles can be transmitted. This range of frequencies has been found to be adequate for acceptable resolution of the picture detail in the reproduced image.

As of this date, no final standards of transmission have yet been established in the United States for the transmission and reception of television images in colors which are comparable to those for monochrome operation. However, due to the tremendous investments which have been made in television transmitters and television broadcast receivers for monochrome operation, it is highly desirable, if not almost essential, that any standards adopted for color television be such as to render as little existing equipment obsolete as possible. To this end, color television transmission should ideally be capable of accomplishment within essentially the same standards as those already established for monochrome transmission, or at least be compatible with present standards. That is, the standards for color transmission should be such as to permit a conventional monochrome receiver to reproduce a satisfactory black-and-white image in response to receipt of a color signal. This immediately creates certain technical difficulties, because it is generally agreed that picture signals representative of at least three different color components must be transmitted for production of high-quality color pictures. These are commonly designated as the green, red, and blue picture signals, and they will be so designated for convenience in the following specification, although those skilled in the art of colorimetry will understand that the three additive primary color components are actually required to be a green, a red-orange, and a blue-violet.

Thus far, the systems which have been developed for color television may be broadly placed in two classes: (1) those in which the signals representative of the different color components are transmitted in a predetermined time sequence by time division multiplex techniques, and (2) those in which the signals representative of the different color components are transmitted simultaneously over different frequency channels.

The first class includes systems of the so-called "field sequential" type in which interlaced picture fields are sequentially transmitted in the different colors, and of the "line sequential" type in which interlaced scanning lines are sequentially transmitted in the different colors, and of the "dot sequential" type in which the small, individual picture elements are sampled in the different colors in a predetermined sequence and then sequentially transmitted.

In all such color television systems, the common problem is presented of transmitting as much picture detail as possible within a transmission channel of predetermined bandwidth. With most of the various sequential systems heretofore proposed, it has been possible to transmit an adequate range of picture frequency components within the band of 4.5 megacycles now allotted for monochrome transmission, at the expense of reducing the effective field repetition rate. This gives rise to flicker, color smearing, and other undesirable effects, to a greater or less degree.

The simultaneous type of transmission permits all three color components to be transmitted at the same repetition rate, but has generally required a much greater bandwidth for the acceptable reproduction of picture detail. In simultaneous color television systems developed some years ago, bandwidths of from 12 to 16 megacycles were employed, but in recent years a considerable reduction in bandwidths has been achieved, without objectionable loss of picture detail, through the use of the "mixed highs" principle. This will not be described herein in complete detail, since it is well known to those skilled in the art and is described in the literature. See for example the textbook entitled "Radio Engineering" by F. E. Terman, pages 854–856 (McGraw-Hill, 3rd ed., 1947) and U. S. application Serial No. 714,750, filed December 7, 1946, by Alda V. Bedford for "Simultaneous Multi-Color Television," now Patent 2,554,693, granted May 29, 1951.

Very briefly, the "mixed highs" system is based on the premise that it is not necessary to transmit a full frequency range of signal components for each of the three component colors in order to obtain an image which is satisfactory to the eye. The green signal is transmitted with a substantially full range of components extending up to approximately 4 megacycles, and it has mixed with it the higher frequency components of the red and blue signals. The higher frequency components, or "highs," of all three signals comprise the "mixed highs." Only the lower frequency components, or "lows," of the red and blue signals are then transmitted on separate bands, which need not be as wide as the band required for the green signal. At the receiver, equal portions of the mixed highs from the green signal are impressed on each of the three cathode ray systems employed to reproduce the color images, only the lows are impressed on the respective systems individually; the net result is that the lows in the three color signals are reproduced in their respective colors in the composite color image, while the mixed highs are simultaneously reproduced in all three colors so as to cause the fine detail of the image to appear in shades of gray. The technique is similar to that employed in color printing, in which the fine detail of the image is carried by the so-called "black printer," only the broader details being printed in colors. However, the effect upon the eye of the observer is not substantially different from that obtained when all three complete bands of color components are transmitted and reproduced separately, thus allowing a substantial reduction in bandwidth for the same apparent picture detail.

The exact line of frequency division between the lows and highs of each color image signal has been found not to be particularly critical. The eye is most sensitive to the green component, and it is much less sensitive to the red and blue components. It has been found that only those frequency components of the red and blue signals below approximately one megacycle in frequency are needed for good color rendition. In fact, the frequency range of the transmitted blue components can be as low as .2 megacycle or even lower. A good practical average for the upper limit of the red and blue lows might be in the neighborhood of .5 megacycle, for example.

Using these known techniques to reduce the bandwidths of the several component signals as much as possible, the problem still remains as to how to transmit the three resultant color signals most efficiently; i. e., (1) the green lows plus the mixed highs, (2) the red lows, and (3) the blue lows. In my copending application, Serial No. 176,405, which was filed July 28, 1950, for "Frequency-Interlace Television Systems," and which is assigned to the same assignee as the present invention, I have shown how three such signals may be simultaneously transmitted within the same 6-megacycle band by modulating the red and blue lows upon subcarriers which have frequencies particularly related to the frequency of the main carrier in such a way that the modulation components of the several sidebands are interlaced in frequency without mutual interference.

In another copending application, Serial No. 216,205, filed March 17, 1951, by Walter Hausz, which is entitled "Color Television System Employing Alternating Low-Frequency Components," and which is also assigned to the same assignee as the present invention, it is shown how a very acceptable colored picture can be transmitted and reproduced by generating lower-frequency red and blue components corresponding to certain selected scanning lines, or groups of scanning lines and by transmitting them in a predetermined alternating sequence rather than simultaneously. However, if the entire composite color signal is to be transmitted within the standard 6-megacycle band, again the problem is presented of transmitting these "alternating lows" simultaneously with the green lows. It has been suggested, for example, that this may be accomplished by modulating them upon a separate subcarrier and interlacing them with the components of the green lows plus the mixed highs in the manner of my aforesaid copending application.

Another very important consideration, as previously indicated, is compatibility with present monochrome operation. Assuming that the carrier frequency of the composite color television signal lies within one of the established commercial broadcasting channels, it has been found that the "green lows plus mixed highs" signal can be received by a conventional monochrome receiver and utilized to produce a black-and-white picture image which is not significantly inferior to that reproduced in response to a conventional monochrome signal. In my aforesaid copending application, it has been shown how the interfering effects of the red and blue signal components can be canceled out in such case, so far as the eye of the observer is concerned, by properly selecting the subcarrier frequencies with respect to the main carrier frequency.

Although these improved techniques have been demonstrated very successfully, there are still certain practical difficulties inherent in the transmission of signal components which are modulated upon a subcarrier whose frequency must necessarily lie within the same band occupied by video frequency components of another signal. In particular, it has been found that, under certain conditions, video signal components may in themselves act like subcarriers, producing color interference effects.

It is therefore a primary object of the present invention to provide an improved high-fidelity color system which utilizes certain fundamental principles of the aforesaid Hausz application and which provides a high degree of stability and compatibility with the existing monochrome system.

Very briefly, I use the aforesaid principles of "mixed highs" and "alternating lows" to produce (1) a first color image signal having a full range of the dominant green components plus mixed highs, and (2) a second color image signal having alternating groups of red and blue lows corresponding to a predetermined sequence of scanning lines. In one embodiment of my invention, the first signal is then amplitude-modulated continuously upon a main carrier wave. Means are then provided for amplitude-modulating the same carrier wave with the second signal, but in precise phase quadrature to the first signal. At the receiver, two quadrature carrier voltages are injected, using well-known "exalted carrier" techniques, in order to separate out the two signals which are then applied to the several elements of the picture reproducing system. In another embodiment of my invention, the two color image signals are simultaneously modulated upon the same carrier waves by two different types of modulation. For example, the first signal may be carried by amplitude-modulation of the carrier and the second signal by phase-modulation of the carrier. At the receiver, the two signals are separated out by employing suitable detectors for each type of modulation.

As a further refinement, and to avoid the effect of incidental phase-modulation and cross-modulation effects between the components of the doubly-modulated carrier wave, means may also be provided at both transmitter and receiver for reversing the phase of the quadrature modulation components after each successive picture field or frame. It can be shown that the distortion due to any such modulation effects is thereby rendered self-canceling, due to integration in the eye of the observer.

It will also be shown that the preferred type of signal embodying my invention provides compatibility, in that it may be received a conventional monochrome receiver and utilized to produce a black-and-white picture image which is not significantly inferior to that which would be received from a conventional monochrome transmitter.

As a still further refinement, by a proper choice of the color switching sequence of the red and blue lows, the reproduced picture image may be made completely free from the so-called "crawl" effect. That is, the picture will appear completely stationary to the eye of the observer, and there will be no tendency for the eye to follow an apparent movement of the scanning lines either up or down. Furthermore, the image will be free of any "dot structure" or "texture effect," such as is characteristic of the aforesaid dot-sequential types of systems. By proper adjustment of the relative widths of the scanning beams in the receiver, a vary smooth blending of the various color components may be achieved, in accordance with certain principles more fully disclosed and claimed in the aforesaid Hausz application.

It will therefore be apparent that it is a general object of my invention to provide an improved multiplex facsimile or television system which is particularly suited for the transmission and reception of images in natural colors.

Another principal object of my invention is to provide an improved color television system which is fully compatible with existing broadcasting standards for monochrome transmission.

Still another object of my invention is to provide an improved color television system providing high-fidelity pictures in natural colors, in response to the transmission of a complex color signal within the present 6-megacycle channel bandwidth, and which is free from dot structure, crawl or flicker.

Still another object of my invention is to provide improved television or facsimile systems for simultaneously modulating a plurality of partial image signals, which may be representative of various color components of a colored scene, upon a single carrier wave without mutual interference.

For additional objects and advantages, and for better understanding of my invention, attention is now directed to the following detailed description and accompanying drawings. The features of my invention believed to be novel are also particularly pointed out in the appended claims.

Figure 1:
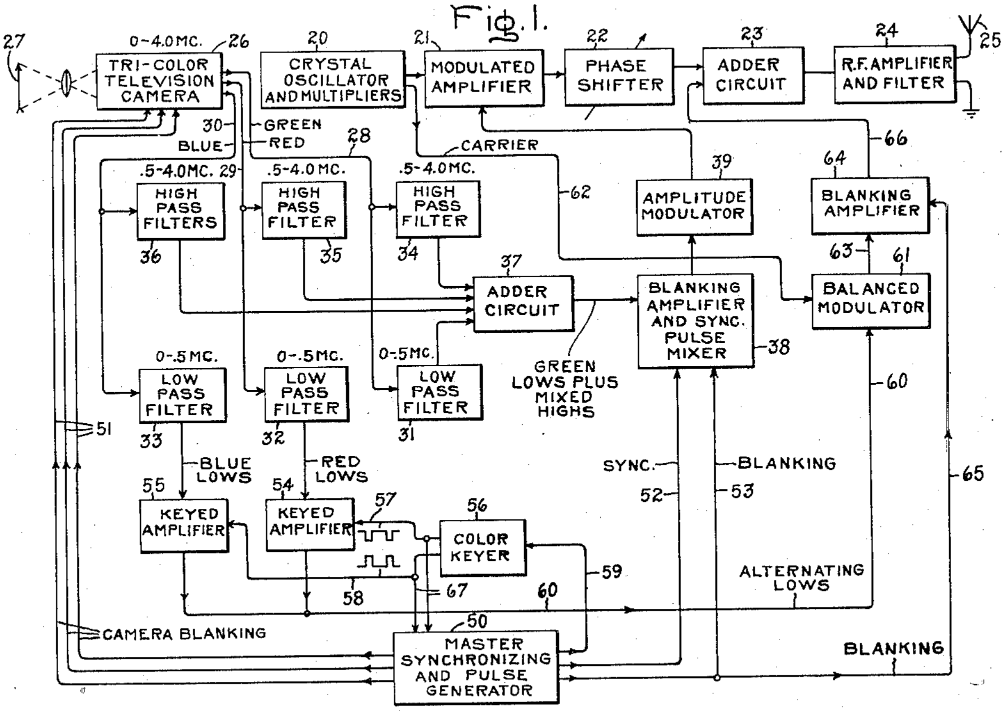
Fig. 1 is a one-line block diagram of a color television transmitter embodying my invention.

In the several figures of the drawings, corresponding elements have been indicated by corresponding reference numerals to facilitate comparison, and those circuit elements which may in themselves being entirely conventional and whose details form no part of the present invention have been indicated in simplified block form with appropriate legends.

Reference is now made to color television transmitter illustrated schematically in Fig. 1. Since all of the individual circuit components and elements of this transmitter may be conventional and of various forms well-known to those skilled in the art, they have been indicated in block form to simplify the drawing. The main carrier wave is derived in conventional manner from a crystal oscillator and frequency multipliers 20. It is modulated, in a manner shortly to be described in greater detail, by certain components of the composite picture signal, in the modulated amplifier 21. After the phase of this modulated carrier wave is shifted by means of a phase shifter 22, for reasons that will also shortly become apparent, it is supplied to an adder circuit 23, in which it is further combined with other picture signal components. The complete modulated carrier wave is then further conventionally amplified and passed through conventional waveshaping filters in the radio-frequency amplifier and filter unit 24 before being impressed upon a suitable signal transmission channel by the antenna 25. The output filter characteristics are preferably such as to provide vestigial sideband transmission, as will readily be understood by those skilled in the art without detailed explanation. For those interested in further details of such filter designs reference may be made for example to the article beginning at page 115 of the "Proceedings of the Institute of Radio Engineers," March 1941, or to the article beginning at page 301 of the "R. C. A. Review," January 1941.

The three color picture signals are generated in a tricolor camera 26 which may be of any known type adapted to scan a colored scene 27 and to deliver three synchronized scanning outputs respectively representative of the green, blue and red color components of the scene. The camera 26 may, for example, comprise three separate camera pickup tubes, each provided with an appropriate color filter and arranged synchronously to scan the scene 27 in proper optical registry. A tri-color camera of the flying spot type might also be used, such as that described in the article appearing in the "Proceedings of the Institute of Radio Engineers," September 1947, at pages 862–870.

The green, red and blue picture signals generated in the camera 26 are respectively supplied over conductors 28, 29 and 30 to three pairs of high pass and low pass filters. The filters of each pair are designed to have substantially the same cut-off frequency, thereby to divide each picture signal into the lows and highs as previously described. This frequency is not particularly critical, as previously pointed out, and is selected to provide the best practical compromise between color balance and detail in the reproduced picture. It may, for example, lie anywhere between about .2 mc. and 1 mc. Thus, assuming that each of the three color signals occupies a band of 0–4.0 mc., the low pass filters 31, 32, 33 may each be designed to have a pass band of about 0–.5 mc. and the three high pass filters 34, 35, 36 may be designed to have a pass band of .5–4.0 mc. The filters are preferably designed to have cut-off characteristics which are not too abrupt, in order to hold "ringing" transients to a minimum, for reasons well-known to those skilled in the art. They should also be nearly complementary, so that the over-all band pass characteristic of each pair of filters approximates that of the impressed camera picture signal.

The outputs of all three high pass filters 34, 35, 36 are supplied to a suitable adder circuit 37 in which they are combined to form the mixed highs of the composite picture signal. Various suitable types of circuits for this purpose are known to the art, the simplest type of circuit, for example, consisting of a plurality of amplifier tubes whose anodes are connected together across a common output load impedance but whose individual control grids are energized separately from the input signals.

The green lows output from the low pass filter 31 is also additionally added to the mixed highs in the adder circuit 37, as shown. It might be wondered why the trouble is taken to split the green signal into highs and lows, and then to recombine them immediately in the adder 37. This is done in order to facilitate independent adjustment of the amplitudes of the several color components in order to obtain the best color balance in the composite signal and reproduced picture.

The output of the adder circuit 37 is supplied to a blanking amplifier and synchronizing pulse mixer 38. Here the synchronizing pulses and blanking pedestals are added to this video signal in well-known manner. The composite wave is then supplied to a conventional amplitude modulator 39, whose output in turn modulates the carrier wave in the modulated amplifier 21.

The usual pulse signals required for blanking and synchronizing the camera sweep circuits, and for supplying the synchronizing pulses and blanking pedestals to the mixer 38, are generated in known manner in a master synchronizing blanking pulse generator 50. Thus, camera blanking signals are indicated as being supplied to the camera 26 over the three conductors 51, and the synchronizing and blanking pulses are indicated as being supplied over the conductors 52 and 53 respectively. The master pulse generator 50 also is designed to generate certain additional special pulse waveforms for reasons that will shortly become apparent.

In order to generate the alternating lows, as previously defined, the red lows and blue lows from the outputs of the low pass filters 32 and 33 are respectively supplied to keyed amplifiers 54 and 55. These amplifiers may be of any suitable types known to the art. For example, one common type comprises a pentode amplifier utilizing the sharp cut-off characteristic of the suppressor grid for keying. The signal to be amplified is impressed on the inner control grid and keying of the amplifier on and off is accomplished by means of rectangular pulses impressed upon the suppressor grid, which alternately render the tube conducting and non-conducting.

The keyed ampilfiers 54 and 55 are rendered alternately conductive, in order to pass video signals to their outputs, by means of a pair of rectangular waves, which have the same shapes but opposite polarities, supplied from a color keyer 56 over conductors 57 and 58, respectively.

As will be explained shortly in greater detail, the keyer 56 is energized over a conductor 59 from the master pulse generator 50 in such a way that color switching between the red lows and blue lows is accomplished at the ends of horizontal scanning lines in a predetermined sequence. The common output conductor 60 connected to these two amplifiers is therefore correspondingly energized alternately by the red lows and blue lows in this predetermined sequence. Portions of the pulse outputs from keyer 56 are also fed back to pulse generator 50, over conductors 67, and utilized to control the color coding of portions of the synchronizing wave, as will be described shortly.

The alternating lows are supplied over conductor 60 to a balanced modulator 61, which also receives carrier waves from the source 20 over conductor 62. The modulator 61 may be of any well-known type which operates to produce modulation sidebands resulting from amplitude modulation of the carrier by the alternating lows signal, and which suppresses the carrier frequency at its output. The resultant sidebands therefore correspond to those produced by amplitude modulation of the carrier by the alternating lows signal. These modulation sidebands are supplied over conductor 63 to a blanking amplifier 64, in which they are mixed with further blanking pulses supplied from the master pulse generator 50 over a conductor 65, in order to prevent their transmission to the output of amplifier 64 during the blanking pedestals of the composite signal, for reasons which will become apparent later. They are then supplied over conductor 66 to the adder circuit 23 in which they are additively combined with the main carrier and its modulation sidebands supplied from the modulated amplifier 21. The circuit of adder 23 may be similar to that of adder 37, as previously described.

In accordance with my invention, the outputs of the modulated amplifier 21 and of the balanced modulator 61 are connected together through the phase shifter 22, which is so adjusted that the radio frequency carrier phases are exactly 90 degrees apart at the input to the adder circuit 23. The phase shifter 22 may be of any suitable type known to the art. It may, for example, comprise a section of transmission line. This transmission line section will be adjusted to have an electrical length exactly equal to a quarter-wavelength at the carrier frequency, providing that all other phases are the same for both modulated stages. Otherwise, as will be understood by those skilled in the art, it must be adjusted to take care of any other phase shifts in the system, so that the resultant signals supplied to the adder 23 are precisely in phase quadrature.

Figure 2:
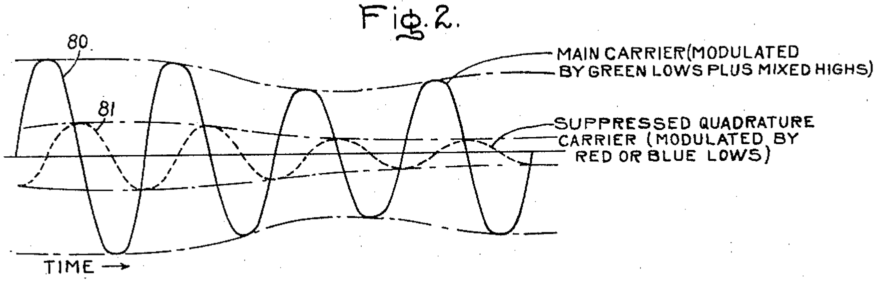
Fig. 2 is a group of wave forms illustrating certain relationships between modulated carrier waves utilized in the transmitter of Fig. 1.

The relative phases of the quadrature carriers are indicated graphically in the simplified diagram of Fig. 2. The main carrier wave, modulated by the green lows plus the mixed highs, is represented by the sine wave 80. The suppressed quadrature carrier, which is correspondingly modulated by the red of blue lows in sequence, is represented by the sinusoidal wave 81, which is in phase quadrature thereto.

Figure 3:
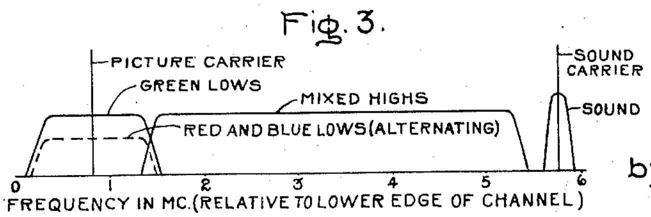
Fig. 3 is a simplified representation of the frequency spectrum occupied by three color television picture signals and an accompanying sound signal, transmitted in accordance with the principles of my invention.

Fig. 3 schematically represents the radiated picture carrier wave and its sideband components, together with the usual modulated sound carrier, within a standard 6–mc. television broadcasting channel. The frequency spacings for the picture and sound carriers may be substantially in accordance with the present standards of transmission for monochrome signals in the United States, for example, as shown on page 843 of the previously-mentioned textbook on "Radio Engineering" by Terman. This is standard vestigial sideband transmission for the picture carrier and its components. Thus, the green lows are indicated as being transmitted substantially as a double sideband while the mixed highs are transmitted in a single sideband extending upward to the usual limit of about 4.0 mc. above the picture carrier. The red and blue lows are also indicated as being transmitted (in alternation) within the same frequency spectrum as the green lows and, it will be remembered, in phase quadrature therewith.

Figure 4:
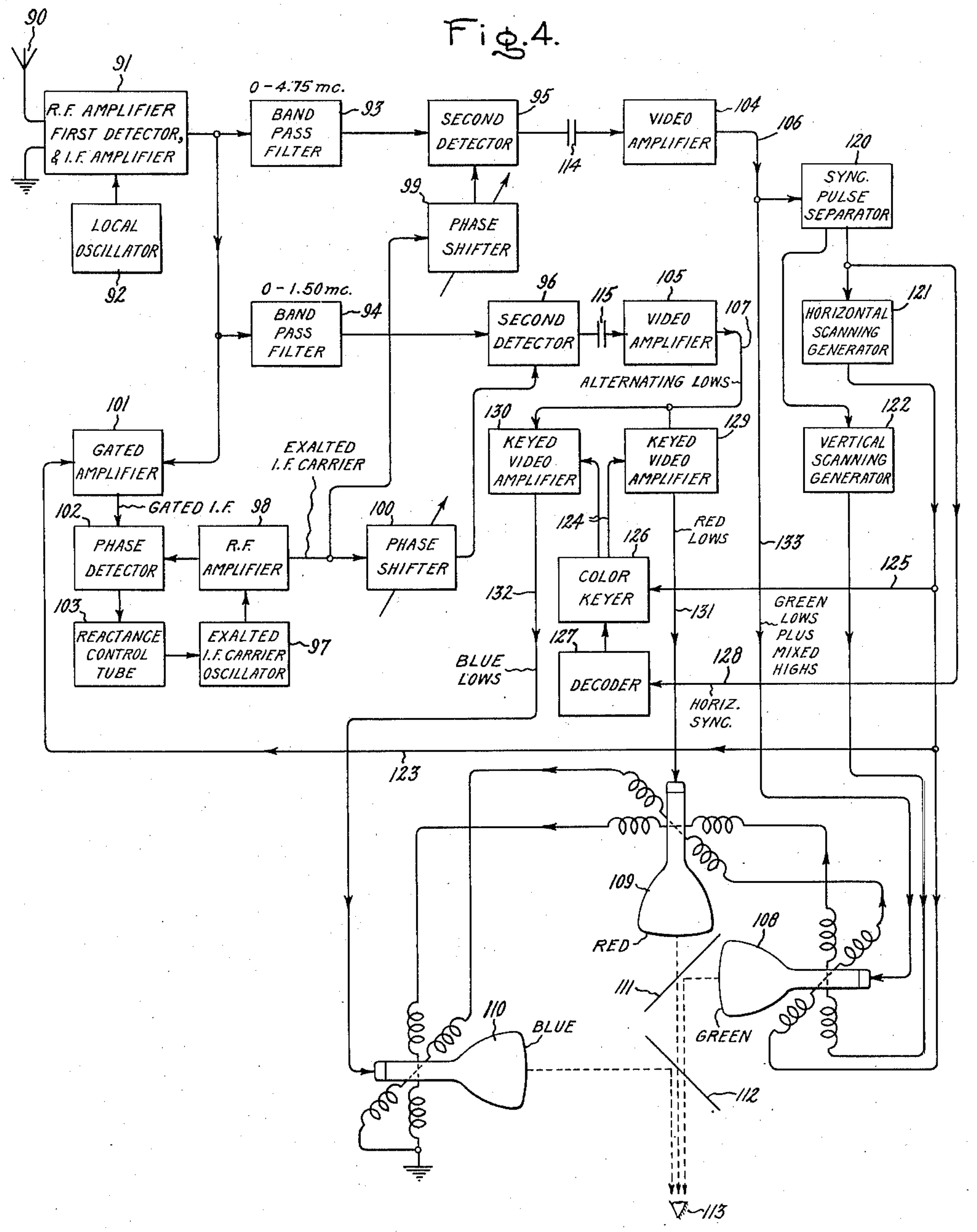
Fig. 4 is a one-line block diagram of a color television receiver constructed in accordance with my invention and adapted to receive the signals from the transmitter of Fig. 1 and to reproduce a colored picture image therefrom.

Fig. 4 is a simplified one-line block diagram of a color television receiver adapted to receive the signals radiated by the transmitter of Fig. 1. The front end of this receiver may be that of a conventional superheterodyne television receiver, in which the signals received on antenna 90 are supplied to a radio-frequency amplifier and first detector, represented within the block 91, in which they are heterodyned with signals from a local oscillator 92 in order to provide the usual intermediate frequency signals which are then further amplified in an I. F. amplifier.

The intermediate frequency signal is next supplied to two band pass filters 93 and 94 in parallel. Using the lower edge of the video modulation band as a reference, the band pass filter 93 is designed to pass the entire range of video frequencies up to about 4.75 mc., while the filter 94 is designed to pass only the frequency band including the lows and extending up to about 1.5 mc.

The outputs of the filters 93 and 94 are respectively supplied to a pair of second detectors 95 and 96. In each of these detectors, the signals are further heterodyned against a locally-generated carrier wave which has the correct phase to demodulate the desired video components. In accordance with known techniques employed in so-called exalted carrier systems, these local carrier waves are generated in an oscillator 97, which generates a carrier wave of intermediate frequency which is maintained in precise synchronism with the incoming I. F. carrier wave. Thus, the output of this oscillator is indicated in Fig. 4 as being supplied through a radio-frequency amplifier 98, and individual phase shifters 99 and 100, to the respective detectors 95 and 96. The phase shifters are so adjusted that the phase of the exalted I. F. carrier wave supplied to detector 95 is exactly in phase with the carrier wave from filter 93, while the phase shifter 100 is adjusted to produce a carrier wave which is in precise quadrature to that from the filter 94.

The oscillator 97 may also be synchronized with the incoming I. F. carrier wave in known manner. Thus, a portion of the I. F. output from the unit 91 is also supplied through a gated amplifier 101 to a phase detector 102. The amplifier 101 is gated, in a manner which will shortly be described in greater detail, so as to be operative only during the blanking pulse intervals of the transmitted wave, when only the unmodulated carrier wave is being transmitted. This avoids any difficulties due to the video modulation of the carrier waves.

The phase detector 102 is also supplied with waves from radio-frequency amplifier 98 and produces an output control voltage which is impressed on a conventional reactance control tube 103, which in turn regulates the frequency of oscillator 97 in known manner so as to maintain it in phase with the incoming gated I. F. signals supplied to phase detector 102.

The resultant video outputs from the detectors 95 and 96 are respectively supplied, through coupling capacitors 114 and 115, to video amplifiers 104 and 105. By virtue of the adjustments just described, it will now be apparent that the output of the video amplifier 104 corresponds exactly to the video signals impressed on the modulator 38 in the transmitter of Fig. 1, and the output of the video amplifier 105 corresponds exactly to the signal supplied to the balanced modulator 60. The green lows plus mixed highs have therefore been recovered, as well as the synchronizing pulse components (at the output conductor 106), and the alternating lows components (at the output conductor 107).

The color television receiver of Fig. 4 is represented as being of the type employing three separate cathode ray tubes, each arranged to produce a fluorescent picture image in one of the three corresponding primary colors. These three picture tubes may therefore be designated as the green tube 108, the red tube 109, and the blue tube 110. Suitable optical means, including for example semi-transparent mirrors 111 and 112, are provided for optically superimposing the three picture images so as to recreate the composite colored picture image as viewed by the eye of an observer at point 113.

The synchronizing pulse components appearing on the conductor 106 are conventionally clipped from the composite picture signal, by means of a synchronizing pulse separator 120. The separator 120 in turn supplies the horizontal synchronizing pulses to the horizontal scanning generator 121 and the vertical synchronizing pulses to the vertical scanning generator 122. Each of these generators is then connected to all three of the corresponding horizontal and vertical scanning coils associated with the three cathode ray tubes, as shown, thereby to cause all three of them to scan in synchronism, as is well known.

The horizontal, or line, scanning voltages are also supplied over a conductor 123 for blanking the gated amplifier 101, for the purposes previously explained. These same pulses are also supplied over another conductor 125 to a color keyer 126. The keyer 126 is also controlled by a decoder 127, which is also energized with the horizontal synchronizing pulses over a conductor 128.

The circuits of the color keyer 126 and decoder 127, and their mode of operation, will be discussed in greater detail in connection with Fig. 6. However, suffice it to say at this point that they are controlled in response to the incoming synchronizing pulse components in order to supply keying pulse waves over conductors 124 to a pair of keyed video amplifiers 129 and 130, in order to render them alternately conductive in exactly the same predetermined sequence as the keyed amplifiers 54 and 55 in the transmitter of Fig. 1. As shown in Fig. 4, these keyed amplifiers, to which the alternating lows are supplied over conductor 107, are thereby rendered alternately operative to supply the red lows over conductor 131 and the blue lows over conductor 132 to the control electrodes of the red and blue picture tubes 109 and 110, respectively. At the same time, the green lows plus the mixed highs are impressed over conductor 133 upon the control electrode of the green picture signal tube 108. It will be noted that this receiver differs slightly from the conventional tri-color receiver employing mixed highs, to the extent that the detail is carried only by the green picture tube. However, the subjective effect is substantially the same as if the mixed highs were supplied to all three picture tubes as described in the aforesaid Bedford application. If it is desired to supply the mixed highs to all three picture tubes, this, of course, can readily be done. The necessary circuit modifications are illustrated in the modified receiver of Fig. 16, and are described at a later point in this specification in connection with that figure.

As previously mentioned, the switching between the red lows and blue lows in the transmitter and receiver occurs during horizontal line blanking intervals in a predetermined line sequence. The simplest system would be to key the transmitter so that, in each picture field, the blue and red lines simply alternate. That is, first a red line would be transmitted and reproduced, then a blue line, then a red line, and so on. As is more particularly explained in the aforesaid copending Hausz application, Serial No. 216,205 filed March 17, 1951, the resultant picture images on the red and blue picture tubes therefore consist of partial picture images having only half the usual number of lines. In order to prevent a horizontal bar structure from appearing in the resultant partial images, it is then necessary to defocus the scanning beams in the red and blue picture tubes so as to make each of them effectively twice as wide as would normally be required. As pointed out in the aforesaid Hausz application, this may be accomplished by simply defocusing the scanning spot or by causing it to have an additional scanning motion at a super-high video frequency of sufficient amplitude to cause it to appear like a scanning line of twice the normal width.

However, this simple one-to-one keying relationship will be found to produce a resultant optical phenomenon known as "crawl" in the viewed image. The preferred choice of color keying rates should be such that no crawling results. I have determined that the necessary condition for elimination of crawl is to complete an integral number of complete keying groups in one picture frame, when employing conventional double-interlace. For example, let it be assumed that 525-line, double-interlaced scanning is being employed in accordance with conventional practice. Now suppose that a complete keying group, consisting of one red element and one consecutive blue element, consists of three scanning lines, such as two lines of red lows and one line of blue lows, or vice versa. It can then readily be demonstrated that the color distribution produced in a complete picture frame (i. e., two consecutive interlaced picture fields) is entirely symmetrical in its distribution of the color groups, so that no apparent crawl results.

The general rule is therefore that the sum of the number of red and blue lines in any one group shall be divisible into the number of lines per frame without remainder. With 525-line scanning, this may be satisfied by having either 3, 5, or 7 lines in each group. These may be divided between the red and blue lines in any desired manner. Since the red phosphors are usually less satisfactory than blue phosphors, in the fluorescent screens utilized for the receiver picture tubes, it is usually more practical to select distributions which favor the red signal. Thus, preferred combinations would be:

(1) Alternation of two red lines with one blue line.
(2) Alternation of three red lines with two blue lines.
(3) Alternation of four red lines with three blue lines.

With any of the above combinations, it will be found that the resultant composite color image is free from crawl. It will, of course, be necessary to modify the effective widths of the scanning beams in the red and blue tubes, in accordance with the number of colored lines which are grouped together. For example, when a two-to-one color switching ratio is employed, each beam must have three times its normal width, etc.

It will now be apparent that the generation of the keying waves supplied to the color keyer 56 in the transmitter of Fig. 1, is a very simple matter, and that it is merely necessary to supply waves of the proper pulse width in relation to the line scanning interval, in accordance with the above principles. It is then of course additionally necessary to provide some means whereby the receiver can determine the exact point of color switching. One of the simplest means is indicated by the waveforms of the curve A in Fig. 5A. This represents a conventional composite video signal, with the exception that the horizontal synchronizing pulses occurring at each of the color switching intervals are modified in shape. Thus, the trailing edges 140 and 141 of the horizontal synchronizing pulses just preceding each of the intervals when blue lows are to be transmitted, are caused to have a different slope from the trailing edges of the pulses just preceding each of the intervals when the red lows are to be transmitted. This figure indicates the preferred sequence in which color group consists of two red lines and one blue line.

Figures 5A, 5B:
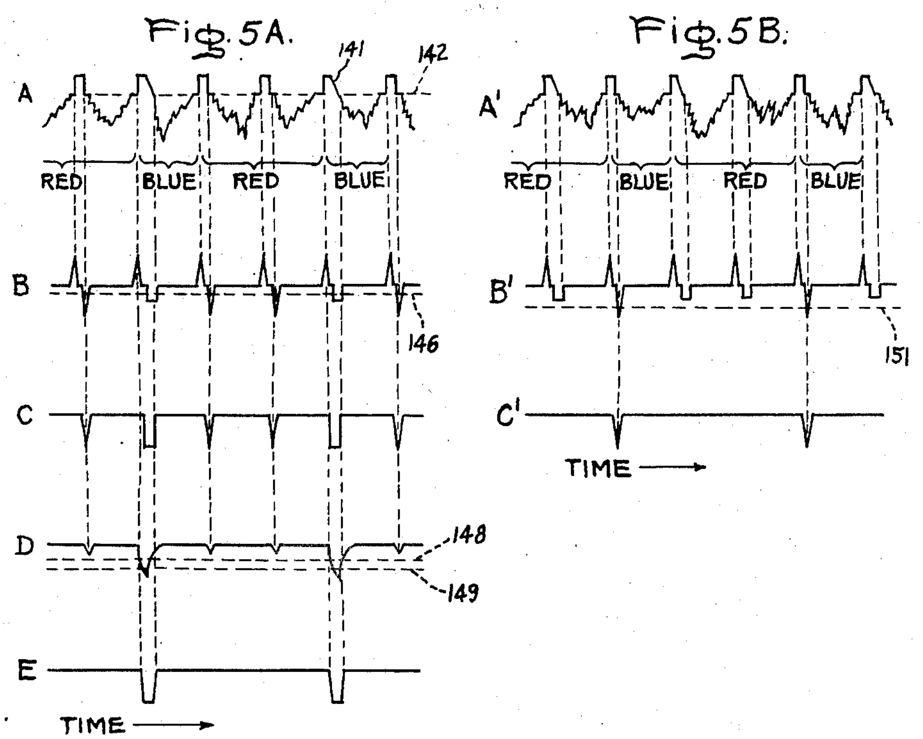
Figs. 5A and 5B are groups of electrical wave forms, on common time scales, illustrating the characteristics of certain color keying circuits employed in the system of Figs. 1 and 4.
Figure 6:
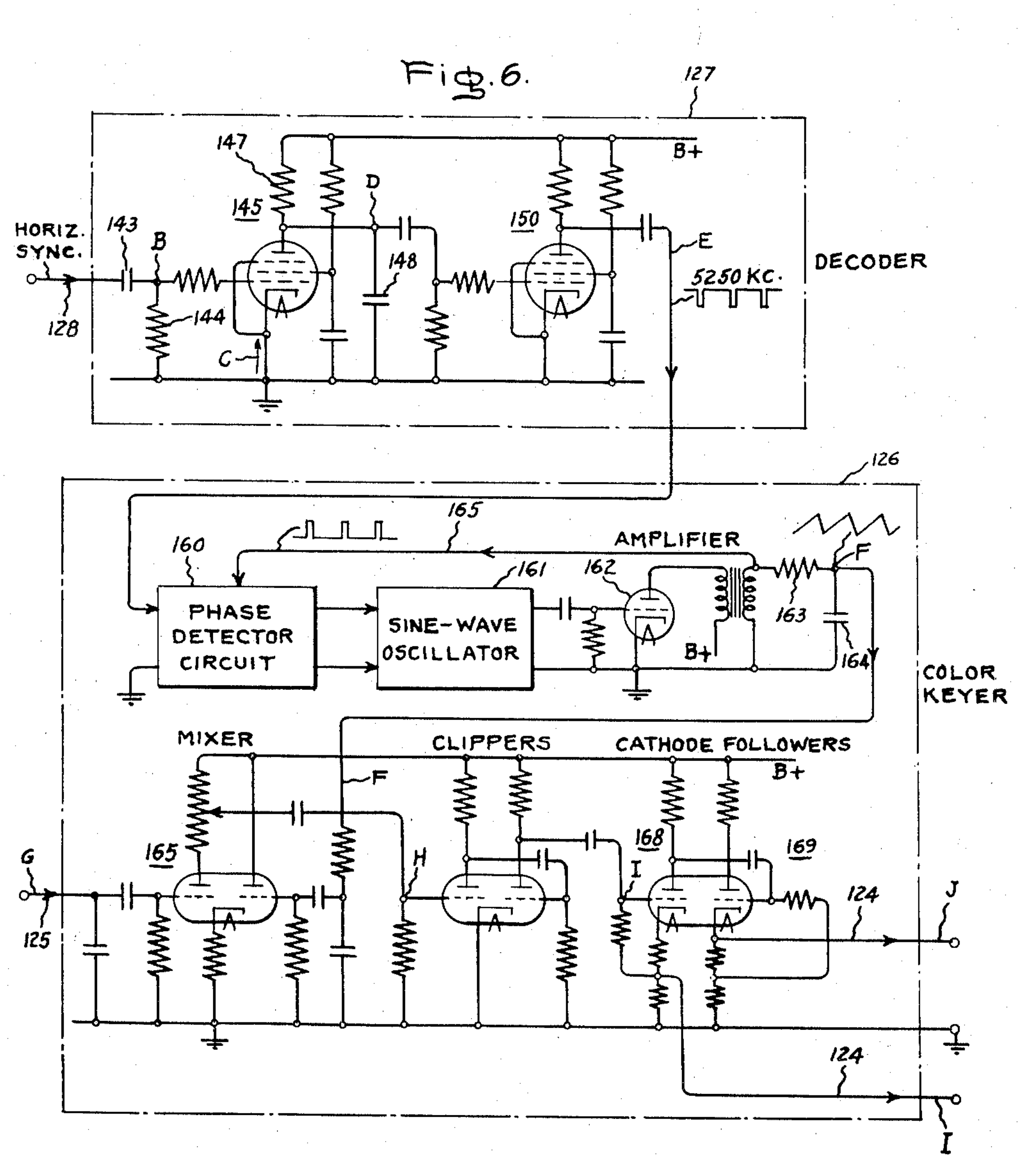
Fig. 6 is a more detailed circuit diagram of the decoder and color keyer of the receiver of Fig. 4.

The decoder 127 in the receiver may then have the form shown in greater detail in the upper portion of Fig. 6. This comprises a differentiating, clipping and integrating network of simple form which converts the wave A of Fig. 5A to the other wave forms indicated in Fig. 5A. Since the synchronizing pulse separator 120 in Fig. 4 passes only the synchronizing pulse components above the clipping level 142 in Fig. 5A, these are the components impressed upon the input to the decoder 127 over conductor 128. They are differentiated by means of series capacitor 143 and shunt resistor 144, in order to produce the wave form B. This wave is clipped, in a clipper stage 145, along the axis 146 in Fig. 5A, yielding the wave form C for the anode current of clipper 145. Integration in the anode load resistor 147 and capacitor 148 then results in waveform D in which the wider pulses, corresponding to the sloped trailing edges of the horizontal synchronizing pulses 140 and 141, are accentuated in amplitude.

The wave D of Fig. 5A is then doubly clipped, between the clipping levels 148 and 149, by means of a second clipper stage 150. The resultant output wave E is therefore a wave having a fundamental repetition rate which is exactly one-third of the horizontal synchronizing pulse rate, and which is precisely synchronized with the switching intervals, as required.

Another possible coding arrangement is indicated by the waveforms of Fig. 5B. The pulse wave form A′ in this figure differs from that of Fig. 5A only in that the trailing edges of horizontal synchronizing pulses preceding the red lines are slanted. In order to obtain the blue keying pulse, it is then only necessary to differentiate to produce the wave form B′ of Fig. 5B, and then to clip along the level 151, giving a resultant keying wave C′. However, this arrangement has the disadvantage that the normal vertical synchronizing pulse components are not automatically removed from the signal, and must be eliminated by other means.

Reference is now made to the detailed circuit of the color keyer 126 shown in the lower portion of Fig. 6. The color keying pulses from the wave E are preferably utilized in a known form of automatic frequency control circuit to synchronize the operation of a sine wave generator, whose output is integrated to produce a sawtooth wave F, which is rigidly synchronized with the color keying pulse wave. This is schematically indicated in block form in Fig. 6 as comprising a phase detector circuit 160, which in turn controls a sine wave oscillator 161. The output of the sine wave amplifier 161 is amplified in a suitable amplifier 162, which is transformer-coupled to an integrating circuit comprising resistor 163 and integrating capacitor 164, in which it is converted to the output sawtooth. Pulses from the output of the amplifier 162 are supplied in known manner over a conductor 165 to the phase detector 160, which operates to produce an output voltage holding the oscillator 161 in rigid synchronization with the incoming synchronizing pulses. The details of such circuits form no part of the present invention and are therefore not illustrated. For further details of a suitable circuit, reference may be made to the copending application, Serial No. 87,862, which was filed April 16, 1949, by Wolf J. Gruen, for "Balanced Phase Detector," now Patent 2,598,370, granted May 27, 1951, and which is also assigned to the assignee as the present invention.

Figure 7:
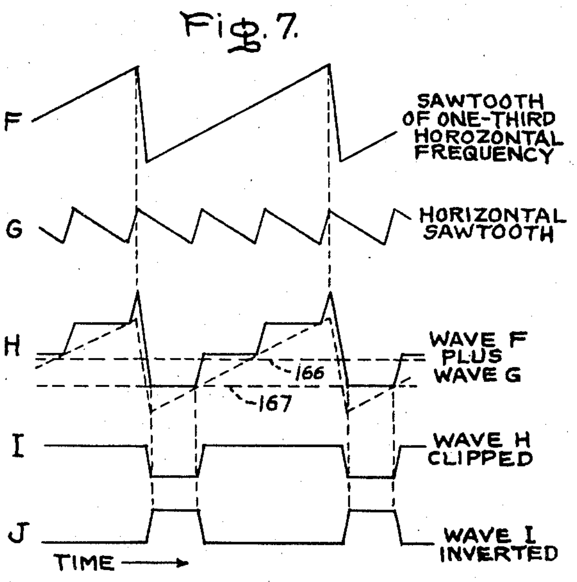
Fig. 7 is a group of electrical wave forms, on a common time scale, illustrating certain characteristics of the circuits of Fig. 5.

The output wave F, which is shown in greater detail in Fig. 7, is therefore a sawtooth wave having a fundamental frequency equal to one-third the horizontal scanning frequency. It is next combined with the horizontal sawtooth sweep voltage G, supplied over the conductor 125, in a suitable mixer stage 165. This mixer circuit comprises two triode amplifiers having a common cathode impedance, and is more fully described and claimed in my Patent 2,519,030 issued August 15, 1950. The relative amplitudes of the two sawtooth waves are adjusted so that the resultant waveform H at the output of mixer 165 has the form shown in Fig. 7. It will be noted that it comprises a very sharply-stepped wave, which may then be suitably clipped between the levels 166 and 167, to provide a resultant rectangular output wave I. The wave I is supplied from a cathode follower stage 168 as one of the output keying waves. It is also inverted and supplied as the other output keying wave from a second cathode follower stage 169, as shown by the wave J.

It will now be seen that, in the system of Figs. 1–7, all color components required for the creation of a high-fidelity color image are transmitted on a single carrier wave, and within the standards of transmission which have been adopted for monochrome operation. A conventional black-and-white receiver will respond to the main modulation components of the received carrier, comprising the green lows plus the mixed highs, and will produce a very satisfactory picture in black-and-white. The horizontal synchronizing function is not disturbed by the special shaping of the trailing edges of certain horizontal synchronizing pulses used for color switching, because the conventional receiver corresponds only to the leading edges of the pulses, as is well known. The color receiver of Fig. 4, when properly adjusted, will produce a high-fidelity color image which is free from excessive evidence of line structure and form objectionable effects due to crawl or flicker. The picture will also have a soft, uniform color composition, free from any dot structure or "texture."

Having thus generally described one representative color television system embodying my invention, a more rigorous mathematical proof may be of interest, particularly in regard to the conditions for compatibility. Let the output of the modulated amplifier 21 in Fig. 1 be represented by the equation:

$$E_g=(M-g)\ \sin\ \omega t \qquad (1)$$

where $M$=black level
$g$=green video modulation including D. C. component
$\omega=2\pi f$
$f$=carrier frequency The output of the balanced modulator 61 for one color is:

$$E_c=(0-c)\ \sin\ \omega t \qquad (2)$$

where $c$=red (or blue) video modulation including D. C. component
$\omega=2\pi f$ as defined above At the input to adder 23, 90° has been subtracted from the sin $\omega t$ of Equation 1 so that the green R. F. signal becomes $$E_g=(M-g)\ \sin\ (\omega t-90^\circ)=(M-g)\ \cos\ \omega t \qquad (3)$$

The combined signal at the output of adder 23 thus is the sum of Equations 2 and 3, or $$E_s=(M-g)\ \cos\ \omega t-c\ \sin\ \omega t \qquad (4)$$

At the color receiver of Fig. 4, a voltage $E$ cos $\omega t$ is supplied to detector 95. The detector output is therefore $$d_{95}=\sqrt{(E+M-g)^2+c^2} \qquad (5)$$

Now E is made purposely to be much larger than $M-g$ and $c$, so that Equation 5 may be written as $$d_{95}=\sqrt{(E+M-g)^2}=E+M-g \qquad (6)$$

Since E is a constant, it may be subtracted from Equation 6 so that the signal fed to amplifier 104 may be $$S_g=M-g \qquad (7)$$

Since amplifier 104 is capacitively-coupled, it does not pass direct current, so M disappears and the output of amplifier 104 is reversed in phase with respect to its input so that the signal fed to the green picture tube 108 is $$s_g=g \qquad (7')$$

Also, in the receiver, a voltage $E_1$ sin $\omega t$ is supplied detector 96. The detector output is therefore $$d_{96}=\sqrt{(M-g)^2+(E_1-c)^2} \qquad (8)$$

Now $E_1$ is made to be much larger in magnitude than $M-g$ and $c$, so that Equation 8 then may be written as $$d_{96}=\sqrt{(E_1-c)^2}=E_1-c \qquad (9)$$

Again, since $E_1$ is a constant, it may be subtracted from (9) and after passing through a phase-reversing amplifier 105, the color signal becomes $$s_c=c \qquad (10)$$

From Equations 7′ and 1 it is seen that the green and color signals may be recovered individually without contamination.

Now assume that a black-and-white receiver is tuned to the combined signal of Equation 4 and that it conventionally employs the I. F. response slope to attenuate the carrier frequency 6 decibels. This requires special treatment, owing to the way in which upper and lower sidebands are unequally transmitted. Equation 4 may be written in sideband form as follows:

$$E_s=(M-A-G\sin mt)\cos\omega t-(B+C\sin nt)\sin\omega t=$$
$$(M-A)\cos\omega t-\frac{G}{2}\sin(\omega+m)t+\frac{G}{2}\sin(\omega-m)t-$$
$$B\sin\omega t-\frac{C}{2}\cos(\omega-a)t+\frac{C}{2}\cos(\omega+n)t \qquad (11)$$

where $A$=D. C. component of green signal
$G$=A. C. component of green signal
$B$=D. C. component of color signal
$C$=A. C. component of color signal
$m$=green video frequency times 2
$n$=color video frequency times 2

The I. F. slope will operate on Equation 11 to reduce carrier terms to 0.5 and to make the amplitudes of upper sidebands $(0.5+K)$, but lower sidebands will be equal to $(0.5-K)$, where K may vary from 0 to 0.5 as a function of the video frequency. Performing these operations on Equation 11, $$E_s'=0.5(M-A)\cos\omega t-\frac{G(0.5+K_1)}{2}\sin(\omega+m)t+$$
$$\frac{G(0.5-K_1)}{2}\sin(\omega-m)t-0.5B\sin\omega t-$$
$$\frac{C(0.5-K_2)}{2}\cos(\omega-n)t+\frac{C(0.5+K_2)}{2}\cos(\omega+n)t \qquad (11a)$$

Expanding (11$a$) in products of sines and cosines, $$E_s'=0.5(M-A)\cos\omega t-\frac{G(0.5+K_1)}{2}\sin\omega t\cos mt-$$
$$\frac{G(0.5+K_1)}{2}\cos\omega t\sin mt+G(0.5-K_1)\sin\omega t\cos mt-$$
$$\frac{G(0.5-K_1)}{2}\cos\omega t\sin mt-0.5B\sin\omega t-$$
$$\frac{C(0.5-K_2)}{2}\cos\omega t\cos nt-\frac{C(0.5-K_2)}{2}\sin\omega t\sin nt+$$
$$\frac{C(0.5+K_2)}{2}\cos\omega t\cos nt-\frac{C(0.5-K_2)}{2}\sin\omega t\sin nt \qquad (11b)$$

Collecting Equation 11$b$ into coefficients of cos $\omega t$ and sin $\omega t$, Equation 11$b$ becomes $$E_s'=[0.5(M-A)-0.5G\sin mt+CK_2\cos nt]\cos\omega t-$$
$$[0.5B+GK_1\cos mt+0.5C\sin nt]\sin\omega \qquad (11c)$$

The detector in the black-and-white receiver will therefore yield an output signal of $$d_m=\sqrt{[0.5(M-A)-0.5G\sin mt+CK_2\cos nt]^2+[0.5B+GK_1\cos mt+0.5C\sin nt]^2} \qquad (12)$$

Expanding (12) gives $$d_m=\sqrt{0.25(M-A)^2+0.25G^2\sin^2 mt+C^2K_2^2\cos^2 nt-0.5(M-A)^G\sin mt+0.5(M-A)CK_2\cos nt-GCK_2\sin mt\cos nt+0.25B^2+G^2K_1^2\cos^2 mt+0.25C^2\sin^2 nt+BGK_1\cos mt+0.5BC\sin nt+GCK_1\cos mt\sin n_t} \qquad (12a)$$

This shows that the color signal can contaminate the green signal, but if the amplitude of the color signal, $B+C$, is never permitted to exceed ¼ of the green signal $A+G$, and $A+G$ is not permitted to exceed ¾ of M, and $A=G$, and $B=C$, and $K_1=K_2=0.333$ (assuming color sidebands extend out only 0.5 mc. either side of the carrier and that green sideband vestige extends 0.75 mc.), Equation 12$a$ may be given numerical values for perhaps the worst condition of "cross-talk."

Substituting numerical values in Equation 12a where $$A=0.33$$
$$G=0.33$$
$$K_1=0.33$$
$$K_2=0.33$$
$$B=.083$$
$$C=.083$$
$$M=1$$

$$d_m=\sqrt{0.135-0.112 \sin mt+0.0093 \cos mt+0.00346 \sin nt+0.0093 \cos nt-0.00775 \cos 2mt-0.000475 \cos 2nt+0.0112 \sin (n-m)t} \quad (13)$$

A shortened series expansion of (13) yields:

$$d_m=0.363-0.153 \sin mt+0.0125 \cos mt+0.0047 \sin nt+0.0126 \cos nt-0.0105 \cos 2mt-0.00065 \cos 2nt+0.0153 \sin (a-m)t \quad (13a)$$

The desired component is sin *mt*, and this is the dominant component. Perhaps the worst spurious signal is the cos *nt* term, which has a magnitude of 0.0126, compared to 0.153 for sin *mt*, or about 21.7 *db* below the desired signal. On the average, of course, the spurious signal will be much lower, particularly when the modulation percentages are lower than maximum, and, of course, for low video frequencies where $K_1=K_2=0$, for an inspection of Equation 12a shows that the coefficient of the cos *nt* term contains the factor $K_2$.

Many modern black-and-white television receivers are of the so-called intercarrier sound type, as particularly disclosed in Patent 2,448,908, issued September 7, 1948, to Louis W. Parker. Such receivers utilize the nominal frequency difference of 4.5 mc. between the picture and sound carriers to establish a 4.5-mc. intermediate frequency for the sound channel. In such a receiving system, any incidental phase modulation of the picture carrier tends to produce a "buzz" in the output of the sound channel. A calculation has been made on the effects of the alternating lows color signal on "intercarrier sound buzz." It has been found that, with the limits set in solving for Equation 13, the amplitude of the "buzz," compared to 100% modulation of the sound carrier, is as follows for different audio frequencies:

| Audio frequency (C. P. S.) | "Buzz" amplitude (decibels) |
|---|---|
| 60 | −59 |
| 100 | −54.5 |
| 250 | −46.6 |
| 500 | −40.8 |
| 1,000 | −36.4 |
| 2,000 | −30.3 |
| 3,000 | −29.6 |
| 4,000 | −29.1 |
| 5,000 | −28.7 |
| 10,000 | −28.2 |
| 15,000 | −28.0 |

While this amount of "buzz" would be noticeable, on the average picture the modulation is not held at maximum for a particular frequency because saturated yellow or saturated aquamarine is not likely to occur in average scenes. These colors are the ones most likely to cause "buzz" because of the fact that they are made up of green-plus-red and green-plus-blue, respectively, at their greatest intensities. Since the green signal modulates the carrier wave negatively, by current broadcasting standards in the United States, the red or blue quadrature component can then produce a vectorial resultant having maximum phase deviation, which is most disturbing to the sound detector in the intercarrier type of receiver. The above table therefore indicates maximum, rather than average, "buzz" conditions.

A constant brightness form of this color system may be obtained by making the signal which modulates amplifier 21 in Fig. 1 carry some of the video voltage due to the other colors in addition to green. For example, during a red scanning line, the voltage of Equation 3 may be $$(\gamma+0.5\rho) \cos \omega t \quad (15)$$

where $\gamma$=green modulation
$\rho$=red modulation
0.5=factor representing the relative visual sensations from red as compared to green light of the same energy level The red signal is then $$\rho \sin \omega t \quad (16)$$

At the receiver, a part of the output of detector 96 is subtracted from the output of detector 95 so that the green tube 108 is dimmed by exactly the same amount that the red tube 109 is illuminated. The total brightness is thus held constant and the principal signal, per Equation 15, is made more nearly panchromatic to aid black-and-white receiver picture reproduction. During a blue scanning line, the voltage of Equation 3 may be $$(\gamma+0.05\beta) \cos \omega t \quad (17)$$

where $\beta$=blue modulation
0.05=relative visual sensation obtained from blue as compared to green light of the same energy level The blue signal is $$\beta \sin \omega t \quad (18)$$

At the receiver, a part of the output of detector 96 is subtracted from the output of detector 95 so that the green tube 108 is dimmed by exactly the same amount that the blue tube 110 is illuminated. Again, the total brightness is thus held constant and the principal signal, given by Equation 17, is made more nearly panchromatic to aid black-and-white receiver picture reproduction.

In the transmission of color pictures by the system of Figs. 1 and 4, any incidental phase modulation of the principal carrier wave by the green signal would be detected by the second detector 96 in Fig. 4, and therefore would produce spurious red and blue signals. It is therefore essential that such phase modulation be held to a very low value. It is also essential to have a high degree of phase stability of the exalted I. F. carrier wave utilized in the receiver to detect the red and blue signals. Otherwise, a deviation of only a degree or two in phase may give rise to a considerable amount of contamination of the red and blue signals by the green signal.

These practical difficulties can be overcome, and the need for extreme phase stabilities can be obviated, by making certain system modifications now to be described in connection with Figs. 8–14. Very briefly, the deleterious effects of both incidental phase modulation and exalted carrier phase inaccuracy are mitigated by modifying the system to operate in the following manner:

At the transmitter:

(1) The principal carrier wave is modulated with the green lows plus the mixed highs in exactly the same manner as previously described.

(2) During odd picture frames (i. e., during picture fields 1, 2, 5, 6, etc.) the quadrature carrier is modulated by the red and blue lows with a 90-degree carrier phase displacement.

(3) During even picture frames (i. e., during picture fields 3, 4, 7, 8, etc.) the quadrature carrier is modulated with a 270-degree phase displacement.

At the receiver:

(1) The green lows plus mixed highs are detected exactly as previously described.

(2) The red and blue lows received during odd picture frames are detected exactly as previously decribed.

(3) The red and blue lows during even picture frames are detected with their sidebands reversed in phase.

It will thus be seen that this system differs from the one previously described in that the quadrature sidebands, due to the red and blue lows, are alternately reversed in phase at the ends of consecutive picture frames. It is therefore necessary to provide additional means for effecting this phase reversal, together with the transmission of suitable additional synchronizing signals which may be received and utilized to effect the switching.

While this switching operation does not electrically remove the undesired phase modulation effects, this is effectively accomplished in the eye of the observer, through the physiological phenomenon of persistance of vision. The distortion effects during odd picture frames, as seen in the composite color image at the receiver, are equal and opposite to the distortion effects seen during even picture frames. They are consequently integrated out by the eye of the observer. The principle is analogous to that employed in the frequency-interlaced color television system, for the cancellation of unwanted signal components, as is more fully described and claimed in my aforesaid copending application, Serial No. 176,405, filed July 28, 1950.

Figure 8:
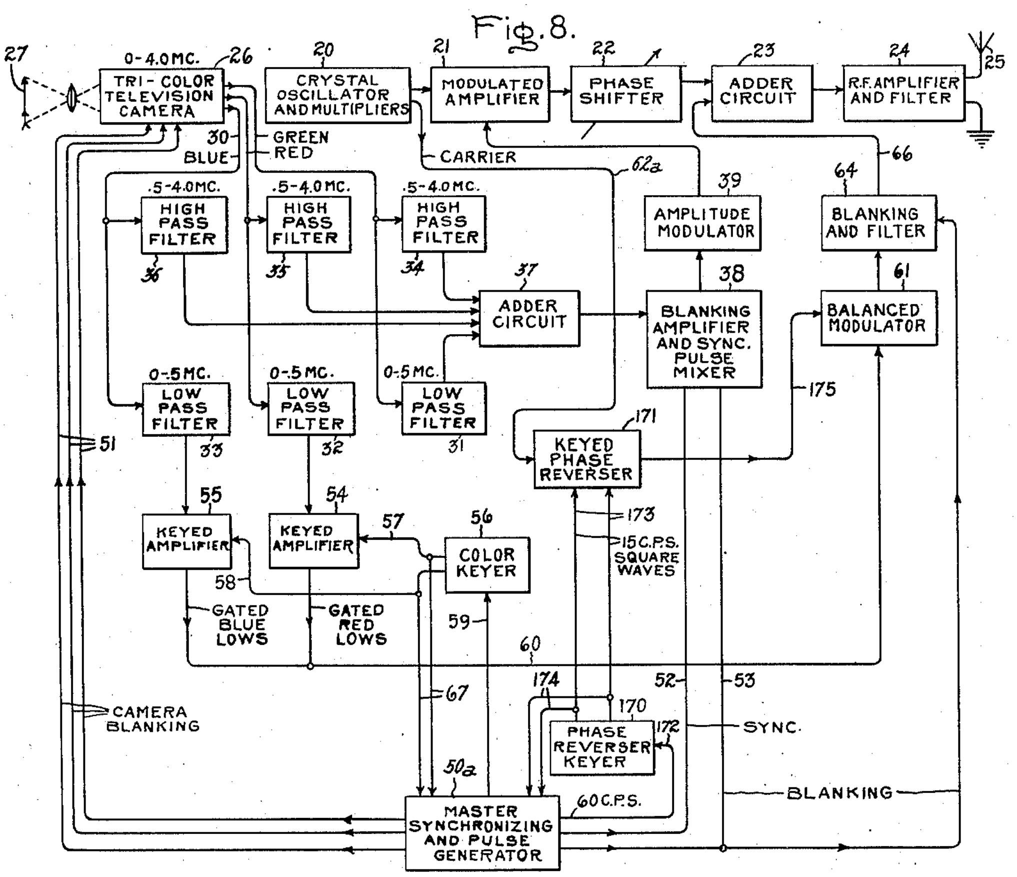
Fig. 8 is a one-line block diagram of a modified form of color television transmitter embodying the principles of my invention.
Figure 9:
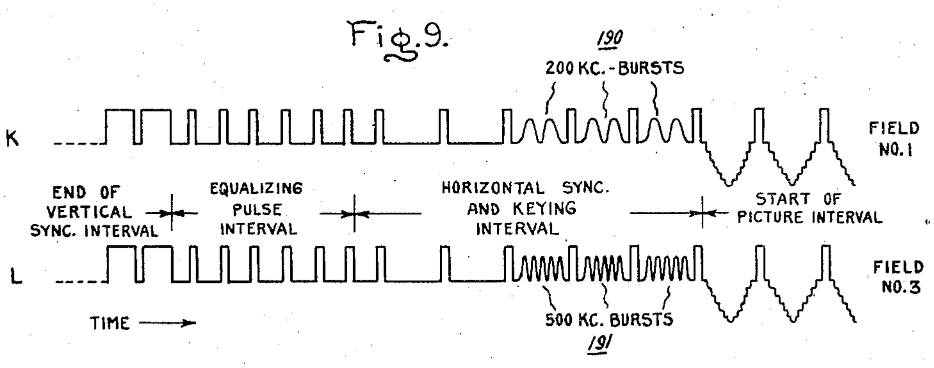
Fig. 9 is a graphical representation of a pair of synchronizing signal wave forms, on a common time scale, which are generated in the transmitter of Fig. 8.

A modified form of color television transmitter embodying these principles is shown in simplified block form in Fig. 8. Most of the circuit elements of this transmitter may be identical to the corresponding elements of the transmitter of Fig. 1. They are therefore identified by the same reference numerals and need not be further described. The main differences reside in the addition of two new circuit components, a phase reverser keyer 170 and a keyed phase reverser 171, as well as in certain internal modifications of the master synchronizing and pulse generator *50a*, which will be described shortly.

Briefly, the function of the added elements is to periodically reverse the phase of the carrier voltage fed to balanced modulator 61, in synchronism with the end of each transmitted picture frame. This is accomplished by supplying a 60-cycle pulse wave from the pulse generator *50a*, over conductor 172, to the phase reverser keyer 170. The output of this keyer comprises a pair of 15-cycle square waves of opposite polarity. These are supplied over conductors 173 in order to control the operation of the phase reverser 171 in synchronism with the ends of the picture frames. These same 15-cycle keying waves are also fed back to the master pulse generator *50a* over conductors 174 in order to control the generation and transmission of coding signals which will enable the color television receiver to produce a phase reversing operation in synchronism with the phase reverser 171.

The carrier wave supplied to the keyed phase reverser 171 over conductor *62a* is thereby caused to reverse its phase, at the end of each transmitted picture frame, at the conductor 175 connected to the balanced modulator 61.

Various suitable methods of coding the transmitted synchronizing signals, in order to identify this phase-switching sequence, will readily occur to those skilled in the art. One preferred method of coding is indicated by the wave forms of Fig. 9, which show the video wave forms at the output of the blanking amplifier 38 near the ends of alternate picture fields. Thus, the wave K represents the synchronizing pulse wave form near the end of field No. 1, and the wave L represents the corresponding wave form near the end of field No. 3. These wave forms are exactly the same as those currently employed in black-and-white television transmission with the exception that groups of short bursts of high-frequency sine-wave components are injected near the ends of the vertical blanking periods. On field No. 1, for example, short bursts 190 are injected which may have a frequency, for example, of 200 kc. At the end of field No. 3, the injected bursts 191 may have a higher frequency, for example, 500 kc. The two frequencies are preferably selected so as to be non-harmonically related, so that harmonics of the lower frequency will not lie close to the higher frequency. Suitable circuits for generating and inserting these sine-wave bursts 190 and 191 into the composite television signal generated by the master pulse generator *50a* will readily be apparent to those skilled in the art without detailed illustration, since these principles are well known and the details of such circuits form no part of the present invention.

The phase reverser keyer 170 of Fig. 8 may be a well-known form of keyed square wave generator, and it is also believed that the details of its design will be readily understood by those skilled in the art without detailed explanation. A suitable circuit for this purpose is disclosed in Patent 2,410,703, which was issued November 5, 1946, to Seymour Berkoff and Robert B. Dome, and which is also assigned to the same assignee as the present invention.

Figure 10:
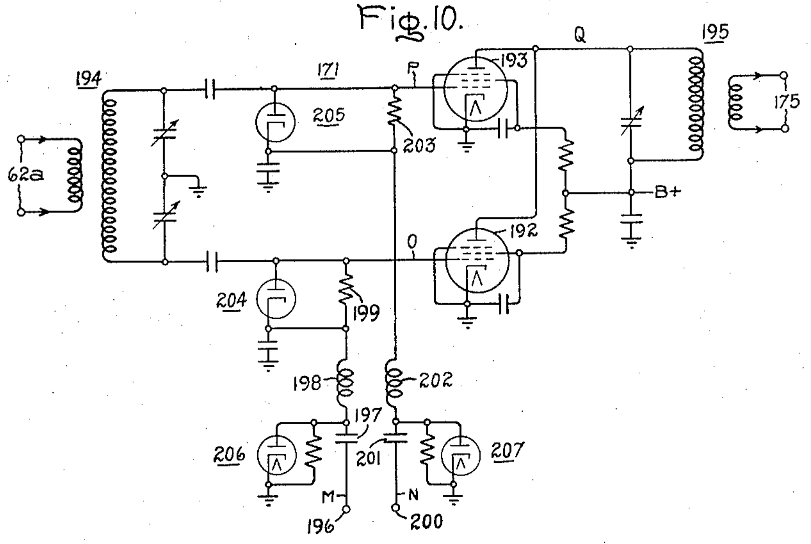
Fig. 10 is a more detailed circuit diagram of the keyed phase reverser in the transmitter of Fig. 8.
Figure 11:
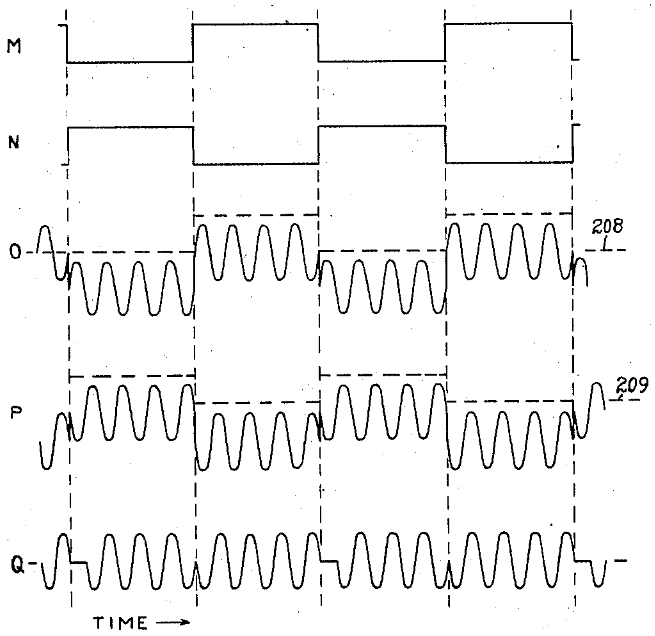
Fig. 11 is another group of electrical waveforms, on a common time scale, illustrating certain operating characteristics of the circuit of Fig. 10.

The circuit details of a suitable keyed phase reverser 171 are shown in Fig. 10, and the circuit operation is illustrated by the wave forms of Fig. 11. The basic principle of this circuit involves the application of out-of-phase carrier signals to the control grids of two amplifier tubes 192 and 193 having a common tuned anode load. By alternately biasing one and then the other of these amplifiers to complete cutoff in response to the two keying waves, the carrier frequency output is periodically reversed in phase. Thus, the input carrier frequency waves from the carrier wave source are supplied through a balanced input circuit 194 to the control grids of the amplifiers 192 and 193 in push-pull. The anodes of the two amplifiers are connected across a common tuned output load circuit 195, as shown. Both the input circuit 194 and the output circuit 195 are tuned to the carrier frequency.

The 15-cycle keying waves are represented by the curves M and N in Fig. 11. The wave M is supplied to input terminal 196 in Fig. 10, and impressed on the control grid of amplifier 192 through a series coupling capacitor 197, radio-frequency choke 198, and resistor 199. The keying wave N is similarly impressed upon input terminal 200, which is connected to the control grid of amplifier 193 through coupling capacitor 201, radio-frequency choke 202, and resistor 203. The resistors 199 and 203 constitute the diode load resistors for a pair of diode detector circuits 204, 205, which function to clamp the input carrier frequency signals so that the control grids of the amplifiers are never driven positive with respect to the keying waves. The keying waves are similarly clamped, so that they are never positive with respect to ground, by means of the pair of diode detector circuits 206, 207.

The resultant wave forms produced at the control grids of amplifiers 193 and 192 are consequently represented by the wave forms O and P in Fig. 11. By virtue of the clamping action of the diode detector circuits, only those portions of the waves O and P above the reference levels 208 and 209 are impressed upon the control grids of the amplifiers 192 and 193, respectively. The resultant output wave Q consequently is reversed in phase at the ends of each of the keying pulses, as required.

Instead of periodically reversing the phase of the carrier voltage fed to the balanced modulator 61 in the transmitter of Fig. 8, an alternative method is to reverse the phase of the alternating lows at the input to the balanced modulator circuit.

Figure 12:
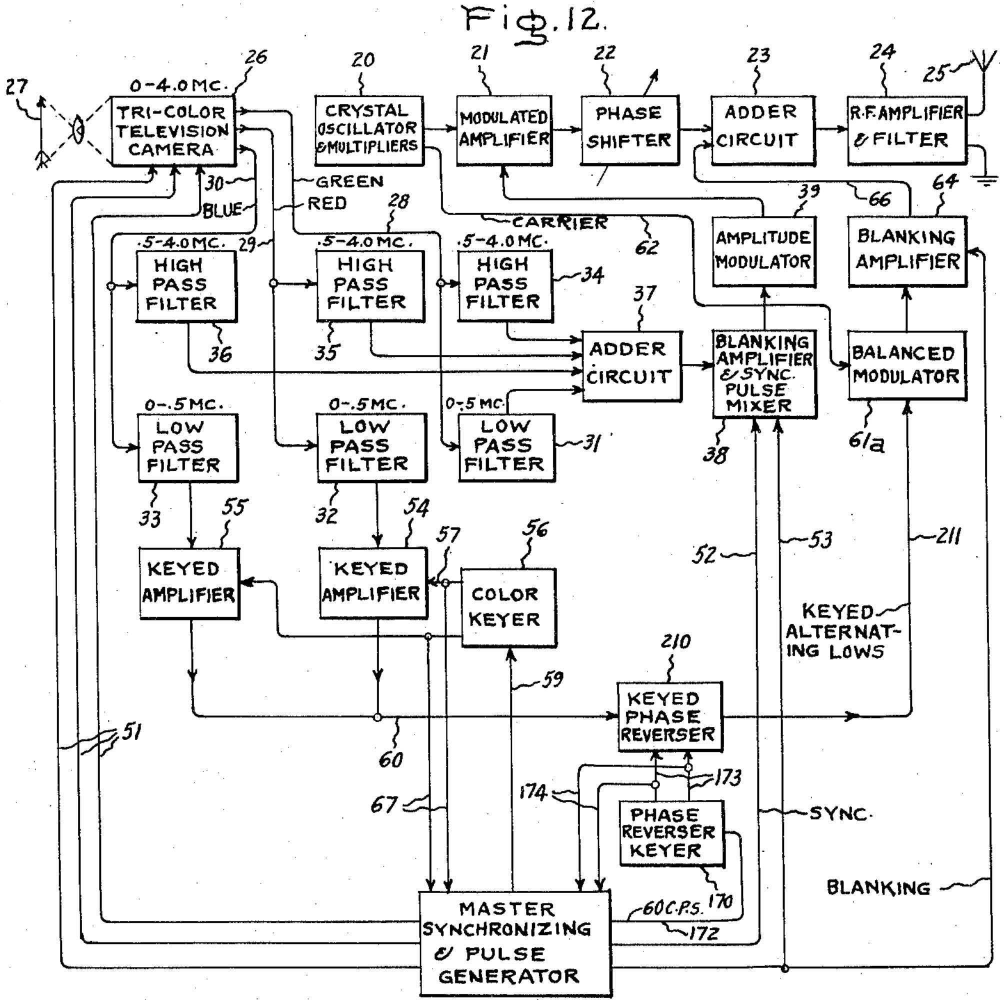
Fig. 12 is a one-line block diagram of a further modification of the color television transmitter of Fig. 8.

A transmitter embodying this modification is illustrated in simplified block form in Fig. 12. Again, most of the circuit elements are identical to the corresponding elements of Figs. 1 and 8, and are identified by the same reference numerals. The principal difference is that, while the balanced modulator *61a* is supplied with the carrier wave over conductor 62 in the same manner as in the transmitter of Fig. 1, the phase of the alternating lows is periodically reversed at its modulation input by means of a keyed phase reverser 210, which has an output connection 211 to the balanced modulator *61a*.

Figure 13:
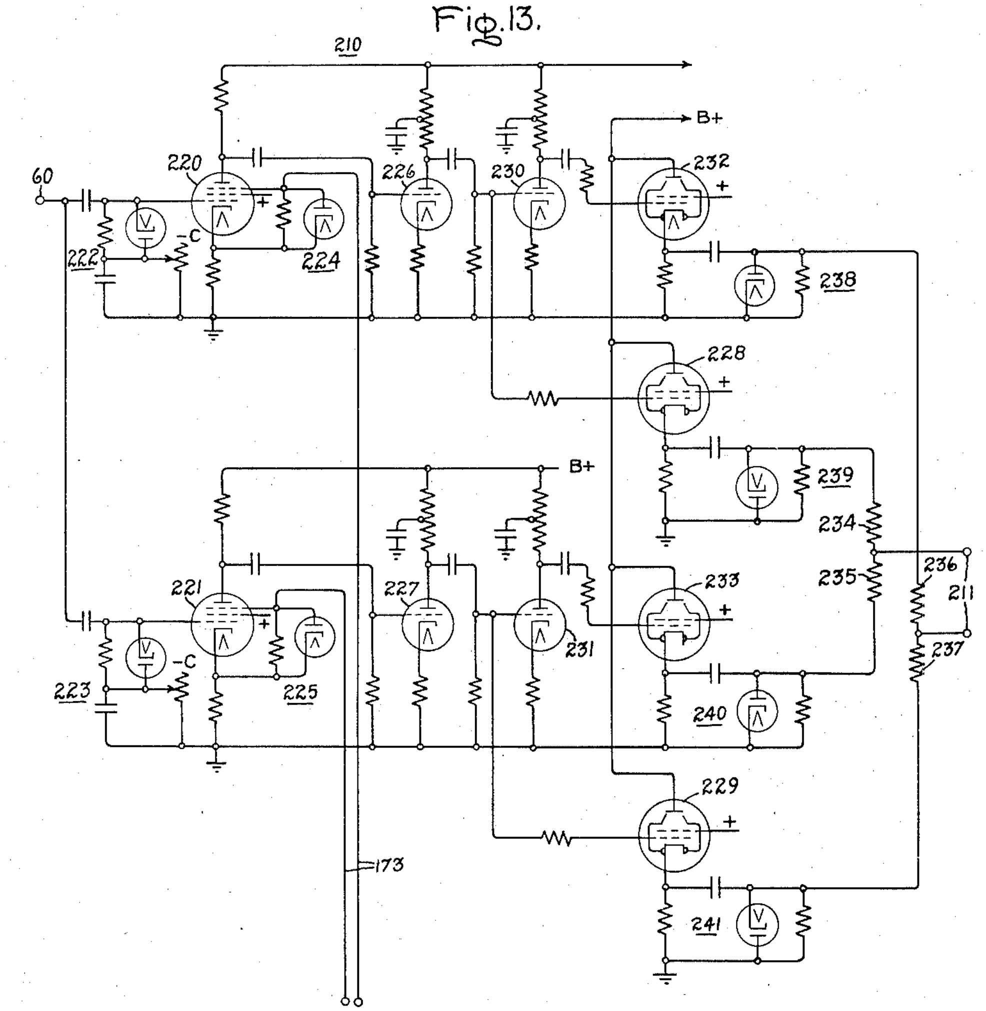
Fig. 13 is a more detailed circuit diagram of the keyed phase reverser in the transmitter of Fig. 12.

The details of a suitable circuit for the keyed phase reverser 210 are shown in the circuit diagram of Fig. 13. The alternating lows signals from conductor 60 are impressed upon the control grids of a pair of amplifiers 220 and 221. These amplifiers are properly referenced to ground by means of diode clamp circuits 222 and 223 in their grid-to-cathode connections. The amplifiers 220 and 221 are represented as pentodes which are alternately keyed on and off by means of the keying waves from conductors 173, which are impressed on their respective suppressor grids. These grids are also properly referenced to the cathodes by means of diode clamp circuits 224 and 225.

The amplifiers 220 and 221 are thereby rendered alternately conductive and non-conductive at the desired keying rate. The output signals from the amplifiers 220 and 221 are further amplified in amplifiers 226 and 227 and are then impressed upon a pair of output cathode follower stages 228 and 229, respectively. The amplified signals are also inverted in a pair of phase-inverter stages 230 and 231 and impressed in opposite phase upon another pair of output cathode follower stages 232 and 233. The positive and negative video signal outputs are then added in pairs, in the output load resistors 234, 235 and 236, 237, in order to provide a push-pull phase-reversed output for the balanced modulator *61a*, as required. In order properly to reference the output wave forms to ground, as required by the balanced modulator, four additional diode clamp circuits 238–241 are also employed.

Figure 14:
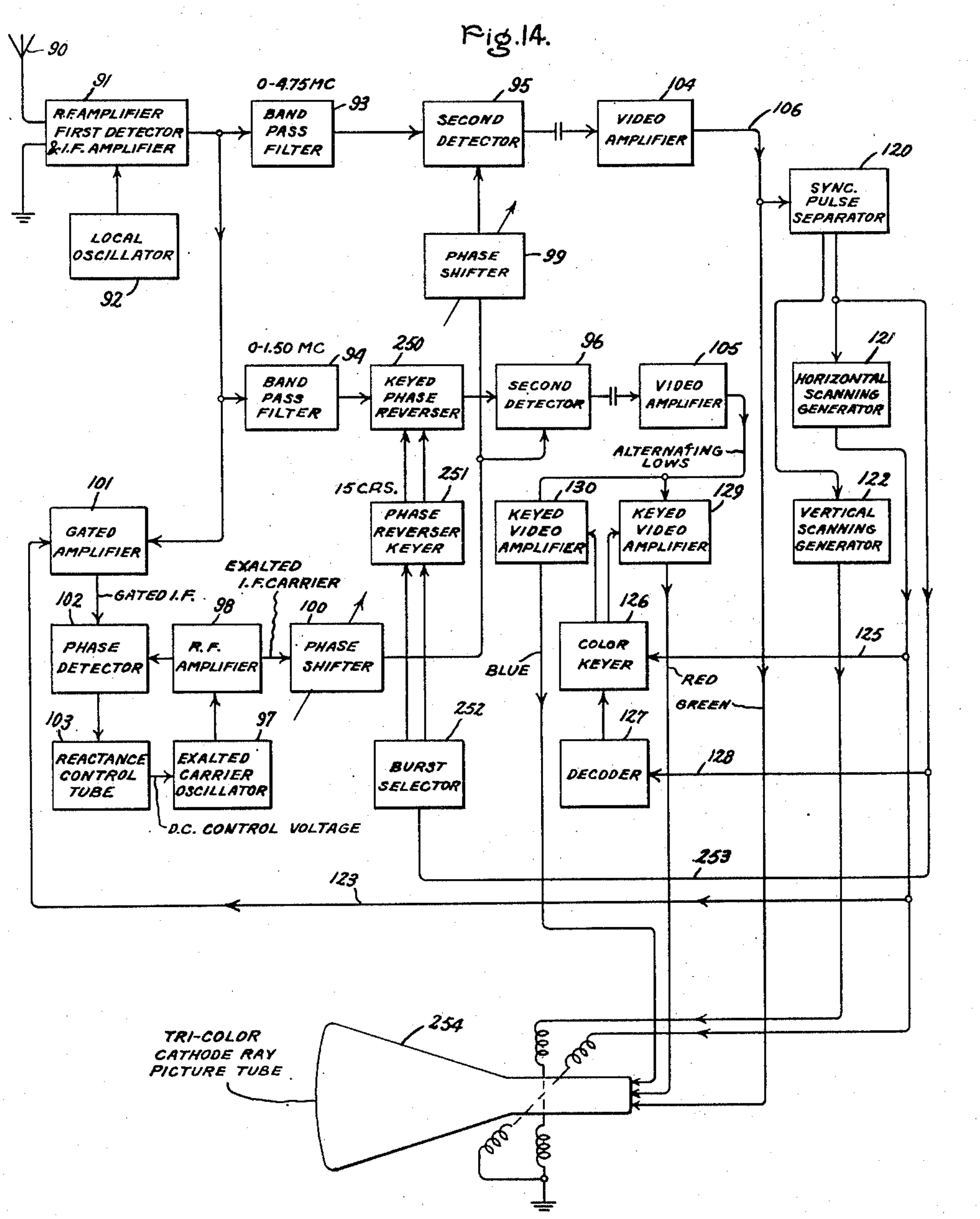
Fig. 14 is a one-line block diagram of a modified form of color television receiver adapted to operate with the transmitters of Fig. 9 or Fig. 12.

Fig. 14 is a simplified block diagram of a color television receiver adapted to receive signals from either the transmitter of Fig. 8 or of Fig. 12. Most of the elements may be identical to those of the receiver of Fig. 4, previously described, and they are therefore indicated by the same reference numerals. The principal difference resides in the addition of the keyed phase reverser 250, in the alternating lows channel, and the phase reverser keyer 251 for controlling it, together with a burst selector 252. The burst selector 252 is energized with the composite synchronizing pulse wave, over conductor 253, and essentially consists of a pair of tuned amplifier circuits adapted respectively to respond to the 200-kc. and 500-kc. keying bursts shown in Fig. 9. These are utilized to form keying pulses, in a manner well known to the art, which control the generation of the 15-cycle switching waves in the phase reverser keyer 251. The keyed phase reverser 250 may be essentially the same as that shown in Fig. 10 and operates in similar manner to reverse the phase of the intermediate frequency signals, representative of the alternating lows, at the input to the second detector 96.

An alternative form of tri-color cathode ray picture tube 254 is also shown in the receiver of Fig. 14, for the purpose of illustration. This tube merely combines the functions of the three separate cathode ray tubes of Fig. 4. It may, for example, be essentially the same as the three-gun tube described in the magazine "Radio and Television News," June 1950, pages 46, 47 and 118 (and particularly shown in Fig. 1 of that article). However, one slight modification is necessary in the electron gun structure to adapt this type of tube to the present invention. This results from the fact that the relative widths of the electron beams which produce the red and blue picture images must be somewhat defocused in order to compensate for the alternating lows pattern, as previously described in connection with the receiver of Fig. 4. This, of course, can very simply be accomplished by proper adjustment of the beam apertures.

In the modified systems just described in connection with Figs. 8–14, the phase reversal of the alternating lows is accomplished at the 30-cycle frame-scanning rate. It will also be obvious that switching may optionally be accomplished at the end of each picture field, if desired. This merely requires the injection of the 200-kc. and 500-kc. keying bursts at the ends of alternate picture fields and the modification of the phase reverser keyers for operation at a 30-C. P. S. rate instead of a 15-C. P. S. rate. It will also be obvious that phase reversal may optionally be accomplished at the ends of consecutive scanning lines, or groups of scanning lines. In such cases, the high-frequency "bursts," for example, at 200 kc. and 500 kc., may be transmitted on the rear portions, or "back porches" of the proper horizontal blanking pulses, in order to provide signals for synchronizing the corresponding phase reversals at the receiver. This technique is also known to the prior art and need not be elaborated here.

Figure 15:
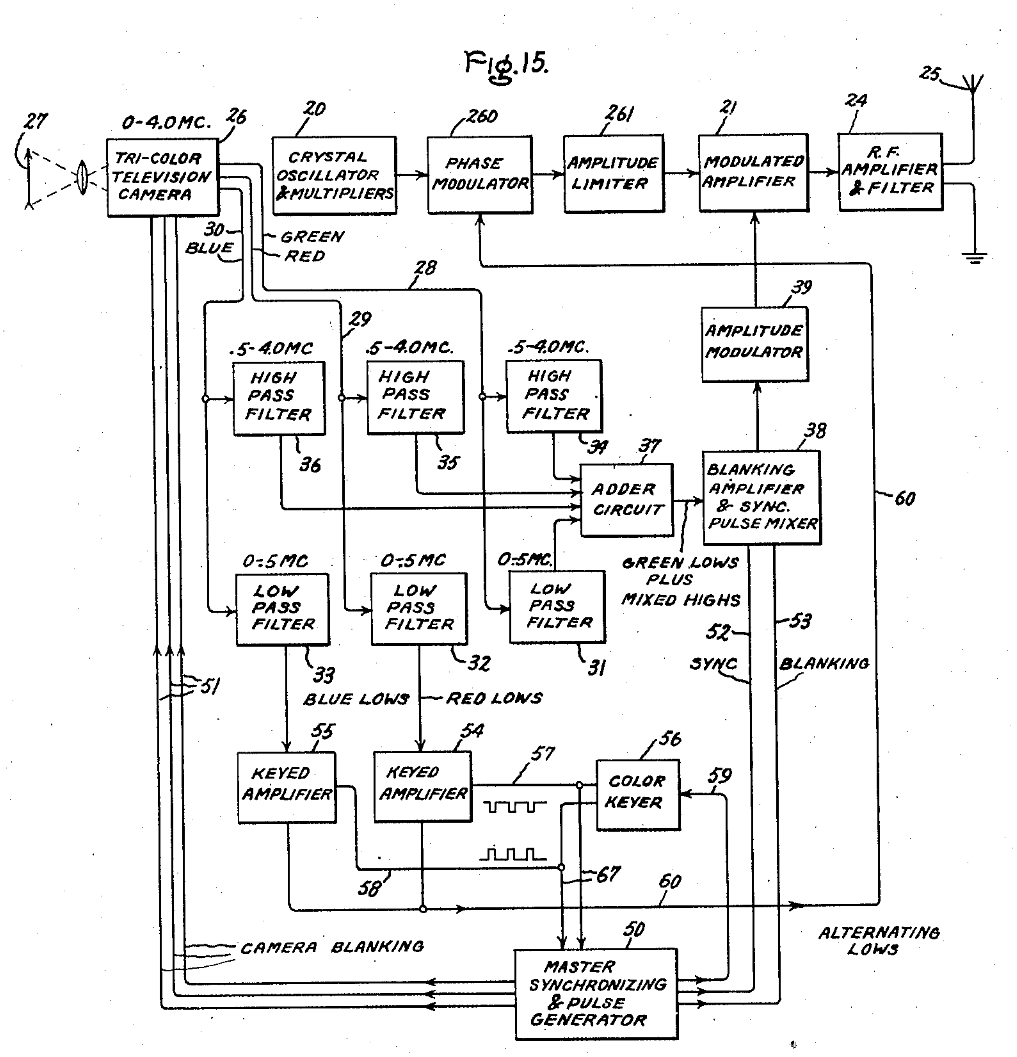
Figs. 15 and 16 are respectively simplified one-line block diagrams of a color television transmitter and color television receiver illustrating another embodiment of my invention.
Figure 16:
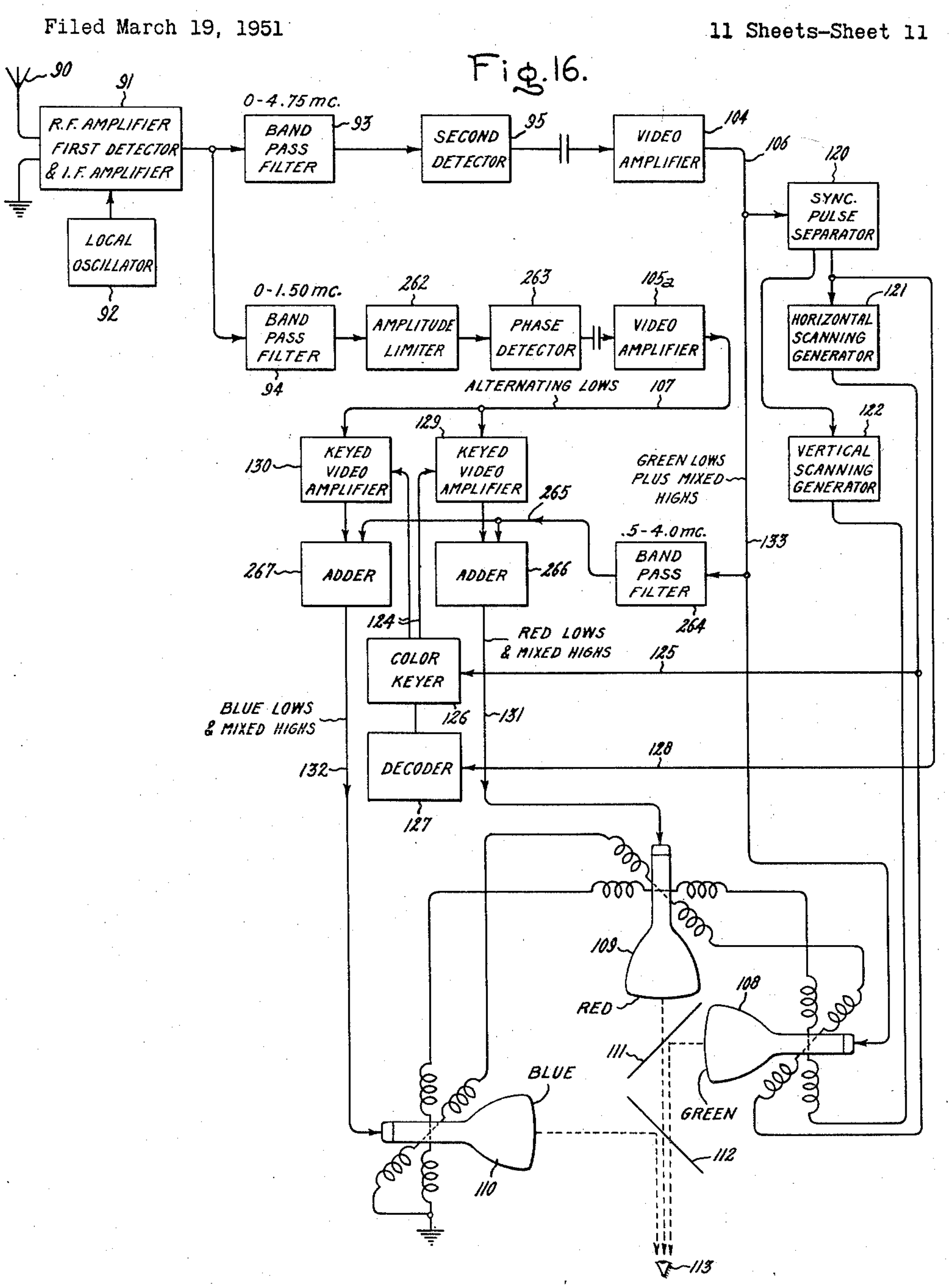

In the color television systems thus far described, I have employed quadrature modulation of the common carrier wave for the simultaneous transmission of the two different component signals. Figs. 15 and 16 are simplified schematic block diagrams of a transmitter and receiver, respectively, of a system which employs a different method of doubly-modulating the common carrier. Briefly, in this system the green lows and the mixed highs are carried as amplitude modulation of the carrier, while the alternating red and blue lows are carried as phase modulation of the same carrier.

Since many of the circuit components of the color television transmitter of Fig. 15 may be identical to those of Fig. 1, and may operate in the same manner, they have been identified by the same reference numerals and need not be further described. The green lows plus mixed highs are amplitude-modulated upon the carrier wave supplied to modulated amplifier 21, by means of the amplitude modulator 39, in the same manner as previously described in reference to Fig. 1. The principal difference is in the manner in which the alternating lows are modulated on the carrier. In this system, the carrier wave, generated by the crystal oscillator and multipliers 20 is first passed through a phase modulator 260 and an amplitude limiter 261 before being supplied to the modulated amplifier 21. The alternating lows signal is supplied over conductor 60 to the phase modulator 260, thereby to phase-modulate the carrier in a manner well-known to those skilled in the art. For example, the method of operation may be fundamentally similar to that described and claimed in Patent 2,333,969, which was issued November 9, 1943, to Ernst F. W. Alexanderson for "Television System and Method of Operation," and which is also assigned to the same assignee as the present invention.

A suitable color television receiver for operation with the transmitter of Fig. 15, is shown in simplified block form in Fig. 16. Since many of the circuit components of this receiver may be substantially identical to those of the receiver of Fig. 4, and may operate in the same manner, they are likewise identified by the same reference numerals and need not be further described. In this receiver, the channel for the detection of the green lows plus mixed highs, comprising filter 93, second detector 95, and video amplifier 104, operates in the same manner as previously described in connection with Fig. 4. The principal difference resides in the circuits for demodulating the alternating lows selected by band pass filter 94. As shown, this is accomplished by passing them through a conventional amplitude limiter 262 and phase detector 263.

Those interested in a more detailed disclosure of suitable phase modulation transmitting and receiving circuits, are particularly referred to the article by Murray G. Crosby, entitled "Communication by Phase Modulation," appearing in the Proceedings of the Institute of Radio Engineers, February 1939, pages 125–136.

In the color television receiver of Fig. 16, there is also illustrated an additional circuit modification for supplying the mixed highs to all three elements of the cathode ray reproducing system. To accomplish this, a portion of the video signal supplied over conductor 133 is impressed on a band pass filter 264, which may for example be designed to select a band of frequencies of approximately .5–4.0 mc. These are supplied over conductor 265 to a pair of adder circuits 266 and 267. Here they are added to the blue lows and red lows supplied from the keyed video amplifiers 129 and 130, respectively, before being supplied over conductors 131 and 132 to the red and blue picture tubes 109 and 110, as previously described. In this way, the mixed highs are conventionally impressed on all three of the picture tubes, and, by properly adjusting their relative amplitudes, they may be caused to produce a resultant picture image in a neutral shade of gray, as previously explained. It will also be obvious that this same modification may be applied to the receiver of Fig. 4 if desired.

In the combined amplitude-phase modulation system shown in Figs. 15 and 16, no means have been shown for reversing the phase of the alternating lows at the ends of consecutive picture fields or frames. However, if it is found that any substantial distortion results from cross-modulation effects, due to the double modulation of the carrier wave, this can readily be cancelled out, so far as the eye of the observer is concerned, by the same techniques previously shown and described in connection with the system of Figs. 8 and 14. Thus, it is merely necessary to pass the alternating lows through a keyed phase reverser before supplying them to the phase modulator 260 in Fig. 15, and to insert the special high-frequency keying bursts as previously described in connection with Figs. 8 and 9. In the receiver of Fig. 16, it is then merely necessary to include a keyed phase reverser, as shown in Fig. 14, between the phase detector 263 and the video amplifier 105*a*. The control circuits for these keyed phase reversers in transmitter and receiver are also the same as those previously illustrated in Figs. 8 and 14, and their operation will be obvious from what has been said previously.

In the transmitter described in conjunction with Fig. 15 I have suggested that either frequency-modulation or phase-modulation may be used to transmit the alternating lows components. In order further to improve the reception of color pictures on present day black-and-white receivers, it has been found that a combination of these two types of modulation may be employed to advantage. I therefore wish it to be understood that either of these types of modulation, or a combination of the two, are included within the generic term "angular modulation," as used in the claims appended hereto.

In this modification, phase-modulation of the carrier is employed for lower video-frequencies within the red and blue lows bands, and this is gradually changed to frequency-modulation at the higher video frequencies within these bands. The exact transition frequency is not critical. It may for example lie in the range of about 10 kilocycles to 200 kilocycles.

This transition may readily be accomplished by inserting a simple slope filter network, in the transmitter of Fig. 15, in the connection 60 just preceding the phase modulator 260. The network consists of a simple series resistor R followed by a shunt capacitor C. I have found by tests that the following combinations of values for these filter elements may be employed:

(1) $R$=6800 ohms and $C$=.001 mfd., or
(2) $R$=6800 ohms and $C$=.0005 mfd., or
(3) $R$=6800 ohms and $C$=.0002 mfd.

These three combinations provide different transition frequencies in ascending order.

It will now be apparent that I have provided improved color television systems and methods which combine many desirable features of both simultaneous and sequential systems. Full advantage is taken of prior art techniques in the use of alternating lows and mixed highs. The entire composite color television picture signal is modulated upon a single carrier wave without the use of subcarriers. Any residual cross-modulation components, resulting from the double-modulation of the carrier wave, may be cancelled out, so far as the eye of an observer at the receiver is concerned, by employing the principles of carrier or video phase reversal on alternate picture fields or frames. This system may operate within the present standards established in the United States for black-and-white television, and may be completely compatible. The resultant color picture image at the receiver has excellent texture and is free from flicker, crawl or dot structure.

While I have shown and described various specific embodiments of my invention, and certain modifications thereof, it will of course be understood by those skilled in the art that other modifications may be made without departing from the principles of the invention. I therefore contemplate by the appended claims to cover any such modifications as fall within the true spirit and scope of my invention.

What I claim as new and desire to secure by Letters Patent of the United States is:

1. A multiplex facsimile transmission system comprising means for scanning a scene and for concurrently developing three image signals each corresponding to a different optical characteristic of said scene, frequency-selective means for subdividing each of said signals into two bands of relatively low-frequency and high-frequency components, means for combining the signal components of all three high-frequency bands and one of said low-frequency bands, a source of a carrier wave, means for modulating said carrier wave with a first type of modulation in accordance with said combined signal components, means for alternately modulating said carrier wave with a second type of modulation in accordance with said other two low-frequency bands in a predetermined sequence, and means for transmitting said doubly-modulated wave.

2. A multiplex facsimile transmission system comprising a plurality of line-scanning means for periodically scanning a scene at a predetermined line-scanning frequency and for concurrently developing three image signals each corresponding to a different optical characteristic of said scene, frequency-selective means for subdividing each of said signals into two bands of relatively low-frequency and high-frequency components, means for combining all three high-frequency bands and one of said low-frequency bands, a source of a carrier wave, means for modulating said combined bands on said wave, means for shifting the carrier phase of said modulated wave by an odd multiple of ninety electrical degrees, means for alternately modulating said other two low-frequency bands on said shifted wave at a predetermined frequency which is an integral multiple of the line-scanning frequency, and means for systematically reversing the phase of said alternating low-frequency bands at a frequency substantially lower than said predetermined frequency.

3. A multiplex color facsimile transmission system comprising tri-color camera means for scanning a scene in a plurality of lines and for concurrently developing three image signals each corresponding to a different primary color characteristic of said scene, frequency-selective means for subdividing each of said signals into two bands of relatively low-frequency and high-frequency components, means for combining all three high-frequency bands and one of said low-frequency bands, a source of a carrier wave, means for modulating said combined bands on said wave, means for shifting the carrier phase of said modulated wave by an odd multiple of ninety electrical degrees, means for alternately modulating said other two low-frequency bands on said shifted wave in predetermined sequence integrally related to said scanning lines, and means for transmitting said doubly-modulated wave.

4. A multiplex color television transmission system comprising tri-color camera means for scanning a scene in a plurality of substantially parallel lines and for concurrently developing three image signals each corresponding to a different primary color characteristic of said scene, said signals each comprising a similar band of video frequencies, frequency-selective means for subdividing each of said signals into two sub-bands of relatively low-frequency and high-frequency components, means for combining all three high-frequency sub-bands and one of said low-frequency sub-bands, a source of carrier wave, means for modulating said combined bands on said wave, means for shifting the carrier phase of said modulated wave by an odd multiple of ninety electrical degrees, means for alternately modulating said other two low-frequency sub-bands on said shifted wave in a predetermined sequence integrally related to the scanning of said lines, and means for transmitting said doubly-modulated wave over a single-signal channel.

5. A color television transmitter comprising tricolor camera means for concurrently scanning a colored image at predetermined line and frame rates and for developing three bands of image frequencies respectively representative of the green, red and blue primary color components of said scene, frequency-selective means for dividing each of said frequency bands into two substantially-complementary sub-bands, one of a relatively low frequency and the other of a relatively high frequency, a carrier wave source, means for additively combining the components of all said sub-bands except the red and blue relatively low frequency sub-bands and for amplitude-modulating said carrier wave therewith, keying means for selecting portions of said red and blue relatively low frequency sub-bands in alternating time sequence, each portion comprising substantially less than a picture frame and corresponding to an integral multiple, including unity, of a scanning line, and means for amplitude-modulating said alternating portions of said red and blue relatively low frequency sub-bands on said wave in phase quadrature to said combined components.

6. A color television transmitter comprising tri-color camera means for concurrently scanning a colored image at predetermined line and frame rates and for developing three bands of image frequencies respectively representative of the green, red and blue primary color components of said scene, frequency-selective means for dividing each of said frequency bands into two substantially-complementary sub-bands, one of a relatively low frequency and the other of a relatively high frequency, a carrier wave source, means for additively combining the components of all said sub-bands except the red and blue relatively low frequency sub-bands, means for modulating said carrier wave with said combined components so as to produce a group of sidebands thereof, keying means for selecting portions of said red and blue relatively low frequency sub-bands in alternating time sequence, each portion comprising substantially less than a picture frame and each corresponding to a different integral multiple, including unity, of a scanning line, and means for modulating said carrier wave by said alternating portions of said red and blue relatively low frequency sub-bands so as to produce a second group of sidebands thereof capable of being separated from said first group of sidebands.

7. A multiplex television transmitting system comprising a plurality of camera means for synchronously effecting odd-line double-interlaced scanning of a scene at predetermined line and field scanning frequencies and for developing a corresponding plurality of partial picture signals, each said signal extending over a band of video frequencies corresponding to a different optical characteristic of said scene, frequency-selective means for subdividing each said band into similar, complementary relatively low frequency and relatively high frequency sub-bands, means for combining at least said relatively high frequency sub-bands and for modulating them on a common carrier wave to produce sidebands thereof, keying means for selecting time-shared portions of each of the two remaining sub-bands, each said portion corresponding to a different integral number of scanning lines substantially less than the number of lines in one scanning field, means for modulating said selected portions on said carrier wave in such a manner as to produce sidebands capable of being separated from said first sidebands, and means for transmitting said doubly-modulated carrier wave over a single signal channel.

8. A multiplex television transmitting system comprising a plurality of camera means for synchronously effecting double-interlaced scanning of a scene at predetermined line and field scanning frequencies and for developing a corresponding plurality of partial picture signals, each said signal extending over a band of video frequencies corresponding to a different optical characteristic of said scene, frequency-selective means for subdividing each of said bands into similar, complementary relatively high frequency and relatively low frequency sub-bands, means for combining at least said relatively high frequency sub-bands and for modulating them on a common carrier wave to produce sidebands thereof, keying means for selecting time-interlaced portions of each of the two remaining sub-bands, each said portion corresponding to an integral number of scanning lines substantially less than the number of lines in one scanning field, means for modulating said selected portions on said carrier wave in such a manner as to produce sidebands capable of being separated from said first sidebands, second keying means for periodically reversing the phase of said selected portions in synchronism with an integral number of scanning fields, and means for transmitting said doubly-modulated carrier wave over a single signal channel.

9. A multiplex television system comprising a plurality of camera means for synchronously effecting odd-line double-interlaced scanning of a scene at predetermined line and field scanning frequencies and for developing a corresponding plurality of partial picture signals, each said signal extending over a band of video frequencies corresponding to a different optical characteristic of said scene, frequency-selective means for subdividing each said band into similar, complementary relatively high frequency and relatively low frequency sub-bands, means for algebraically combining said three relatively high frequency sub-bands and one of said relatively low frequency sub-bands to form a first composite picture signal, keying means for alternately selecting time-interlaced portions of each of the other two relatively low frequency sub-bands, each said portion corresponding to an integral number of scanning lines substantially less than the number of lines in one scanning field, the total number of scanning lines included in any two adjacent portions being an integral sub-multiple of the number of lines in two consecutive picture fields, means for combining said selected portions to form a second composite picture signal, and means for simultaneously transmitting said two composite picture signals.

10, A multiplex color television transmitter comprising tri-color camera means for synchronously effecting odd-line double-interlaced scanning of a scene at predetermined line and field scanning frequencies and for developing three corresponding partial picture signals, each said signal extending over a band of video frequencies respectively corresponding to the green, red and blue primary color characteristics of said scene, frequency-selective means for subdividing each said band into similar, complementary relatively high frequency and relatively low frequency sub-bands, means for algebraically combining said green, red and blue relatively high frequency sub-bands and said green relatively low frequency sub-bands to form a first composite picture signal, means for modulating said composite signal on a common carrier wave to produce sidebands thereof, keying means for alternately selecting time-interlaced portions of said red and blue relatively low frequency sub-bands and for combining them to form a second composite signal, each said portion corresponding to an integral number of scanning lines substantially less than the number of lines in one scanning field, the total number of scanning lines included in any two adjacent red and blue portions being an integral sub-multiple of the number of lines in two consecutive picture fields, means for modulating said selected portions on said carrier wave in such a manner as to produce sidebands capable of being separated from said first sidebands, and means for transmitting said doubly-modulated carrier wave over a single signal channel.

11. A multiplex color television transmitter comprising tri-color camera means for synchronously effecting odd-line double-interlaced scanning of a scene at predetermined line and field scanning frequencies and for developing three corresponding partial picture signals, each said signal extending over a band of video frequencies respectively corresponding to the green, red and blue primary color characteristics of said scene, frequency-selective means for subdividing each said band into similar, complementary relatively high frequency and relatively low frequency sub-bands, means for algebraically combining said green, red and blue relatively high frequency sub-bands and said green relatively low frequency sub-band to form a first composite picture signal, means for modulating said composite signal on a common carrier wave to produce sidebands thereof, keying means for alternately selecting time-interlaced portions of said red and blue relatively low frequency sub-bands and for combining them to form a second composite signal, each said portion corresponding to an integral number of scanning lines substantially less than the number of lines in one scanning field, the total number of scanning lines included in any two adjacent red and blue portions being an integral sub-multiple of the number of lines in two consecutive picture fields, means for modulating said selected portions on said carrier wave in such a manner as to produce sidebands capable of being separated from said first sidebands, second keying means for periodically reversing the phase of said selected portions in synchronism with an integral number of scanning fields, and means for transmitting said doubly-modulated carrier wave over a single signal channel.

12. A multiplex facsimile transmission system comprising a plurality of camera means for synchronously effecting odd-line double-interlaced scanning of a scene at predetermined line and field scanning frequencies and for concurrently developing three image signals each corresponding to a different optical characteristic of said scene, frequency-selective means for subdividing each of said signals into two bands of relatively low-frequency and high-frequency components, means for combining the signal components of all three high-frequency bands and one of said low-frequency bands to form a first composite picture signal, keying means for alternately selecting time-interlaced portions of the other two low-frequency bands in synchronism with the scanning of said scene, each pair of adjacent portions coinciding with a plurality of scanning lines equal to an integral sub-multiple of the number of lines in two consecutive picture fields, means for combining said selected portions to form a second composite picture signal, means for simultaneously transmitting and receiving said two picture signals, means for simultaneously transmitting and receiving a keying signal in synchronism with the operation of said keying means, means utilizing said received picture and keying signals to reproduce said composite picture signals, and a plurality of cathode ray scanning means utilizing said reproduced signals to produce a composite picture simulating said scene.

13. In a multiplex telvision system: a transmitter comprising a plurality of camera means for synchronously effecting odd-line double-interlaced scanning of a scene at predetermined line and field scanning frequencies and for developing a corresponding plurality of partial picture signals, each said signal extending over a band of video frequencies corresponding to a different optical characteristic of said scene, frequency-selective means for subdividing each said band into similar, complementary relatively high frequency and relatively low frequency sub-bands, means for algebraically combining said three relatively high frequency sub-bands and one of said relatively low frequency sub-bands to form a first composite picture signal, keying means for alternately selecting time interlaced portions of each of the other two relatively low frequency sub-bands, each said portion corresponding to an integral number of scanning lines substantially less than the number of lines in one scanning field, the total number of scanning lines included in any two adjacent portions being an integral sub-multiple of the number of lines in two consecutive picture fields, means for combining said selected portions to form a second composite picture signal, means for generating a distinctive keying control signal synchronized with the operation of said keying means, and means for simultaneously transmitting said two composite picture signals and said keying control signal; and a multiplex receiver comprising means for receiving and separately detecting said three transmitted signals, three cathode ray scanning means each having an intensity control element, means responsive to said received signals for synchronizing the scanning of said cathode ray means with the scanning of said scene, means for energizing the control electrode of a first scanning means with said first picture signal, means comprising a pair of keyed amplifiers for respectively energizing the control electrodes of said other two scanning means with said second signal, and means controlled by said detected keying signal for rendering said amplifiers alternately conductive in synchronism with the operation of said keying means.

14. A multiplex facsimile transmission system comprising means for scanning a scene and for concurrently developing three image signals each corresponding to a different optical characteristic of said scene, frequency-selective means for subdividing each of said signals into two bands of relatively low-frequency and high-frequency components, means for combining the signal components of all three high-frequency bands and one of said low-frequency bands, a source of carrier wave, means for amplitude-modulating said carrier wave in accordance with said combined signal components, means for angularly-modulating said carrier wave in accordance with said other two low-frequency bands in a predetermined alternating time sequence, and means for transmitting said doubly-modulated wave.

15. A color television transmitter comprising tricolor camera means for concurrently scanning a colored image at predetermined line and frame rates and for developing three bands of image frequencies respectively representative of the green, red and blue primary color components of said scene, frequency-selective means for dividing each of said frequency bands into two substantially-complementary sub-bands of lows and highs, a carrier wave source, means for additively combining the components of all said sub-bands except the red and blue "lows" sub-bands and for amplitude-modulating said carrier wave therewith, keying means for selecting portions of said red and blue "lows" sub-bands in alternating time sequence, each portion comprising substantially less than a picture frame and corresponding to an integral multiple, including unity, of a scanning line, and means for angularly-modulating said carrier wave by said selected portions.

16. A color television transmitter comprising tricolor camera means for concurrently scanning a colored image at predetermined line and frame rates and for developing three bands of image frequencies respectively representative of the green, red and blue primary color components of said scene, frequency-selective means for dividing each of said frequency bands into two substantially-complementary sub-bands, one of relatively low frequency and the other of relatively high frequency, a carrier wave source, means for additively combining the components of all said sub-bands except the red and blue relatively low frequency sub-bands and for amplitude-modulating said carrier wave therewith, keying means for selecting portions of said red and blue relatively low frequency sub-bands in alternating time sequence, each portion comprising substantially less than a picture frame and corresponding to an integral multiple, including unity, of a scanning line, a slope filter network, means for passing said selected portions through said network, and means for angularly-modulating said carrier wave by said selected portions after passage through said network, said network having such a characteristic that lower image frequencies within said relatively low frequency sub-bands are essentially phase-modulated on said carrier wave and higher image frequencies within said relatively low frequency sub-bands are essentially frequency-modulated on said carrier wave.

17. A multiplex television transmitting system comprising a plurality of camera means for synchronously effecting double-interlaced scanning of a scene at predetermined line and field scanning frequencies and for developing a corresponding plurality of partial picture signals, each said signal extending over a band of video frequencies corresponding to a different optical characteristic of said scene, frequency-selective means for subdividing each of said bands into similar, complementary relatively high frequency and relatively low frequency sub-bands, means for combining at least said relatively high frequency sub-bands and for amplitude-modulating them on a common carrier wave to produce sidebands thereof, keying means for selecting time-interlaced portions of each of the two remaining sub-bands, each said portion corresponding to an integral number of scanning lines substantially less than the number of lines in one scanning field, a slope filter network comprising series resistance and shunt capacitance means for passing said selected portions through said network, said network being adjusted to have a time constant corresponding to an intermediate image frequency within said relatively low frequency sub-bands, means for angularly-modulating said carrier wave by said selected portions after passage through said network, and means for transmitting said doubly-modulated carrier wave over a single signal channel.

References Cited in the file of this patent

UNITED STATES PATENTS

| | | |
|---|---|---|
| 2,017,886 | Barden et al. | Oct. 22, 1935 |
| 2,075,071 | Usselman | Mar. 30, 1937 |
| 2,333,969 | Alexanderson | Nov. 9, 1943 |
| 2,335,180 | Goldsmith | Nov. 23, 1943 |
| 2,535,552 | Schroeder | Dec. 26, 1950 |
| 2,554,693 | Bedford | May 29, 1951 |
| 2,558,489 | Kalfaian | June 26, 1951 |
| 2,567,040 | Sziklai | Sept. 4, 1951 |
| 2,627,549 | Kell | Feb. 3, 1953 |
| 2,678,348 | Ballard | May 11, 1954 |
| 2,773,929 | Loughlin | Dec. 11, 1956 |

FOREIGN PATENTS

| | | |
|---|---|---|
| 702,182 | Great Britain | Jan. 13, 1954 |

OTHER REFERENCES

"A Six-Megacycle Compatible High-Definition Color Television System," Television, volume VI, 1949–1950, pages 270–290, published by RCA Review.